US 011483110B2

United States Patent
Määttänen et al.

(10) Patent No.: US 11,483,110 B2
(45) Date of Patent: Oct. 25, 2022

(54) EFFICIENT MAC CE INDICATION OF SPATIAL RELATION FOR SEMI-PERSISTENT SRS

(71) Applicant: Telefonaktiebolaget LM Ericsson (publ), Stockholm (SE)

(72) Inventors: Helka-Liina Määttänen, Helsinki (FI); Mats Folke, Vällingby (SE); Sebastian Faxér, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 447 days.

(21) Appl. No.: 16/277,220

(22) Filed: Feb. 15, 2019

(65) Prior Publication Data

US 2019/0280835 A1    Sep. 12, 2019

Related U.S. Application Data

(63) Continuation of application No. PCT/IB2019/050639, filed on Jan. 25, 2019.
(Continued)

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0456* (2013.01); *H04B 7/0617* (2013.01);
(Continued)

(58) Field of Classification Search
CPC .............. H04L 5/0048; H04B 7/0617
See application file for complete search history.

(56) References Cited

U.S. PATENT DOCUMENTS

2015/0148050 A1* 5/2015 Siomina ................ H04J 11/005
                                                                    455/452.1
2018/0206132 A1* 7/2018 Guo ..................... H04W 72/0473
(Continued)

FOREIGN PATENT DOCUMENTS

KR    20120113667 A    10/2012
KR    20120135235 A    12/2012

OTHER PUBLICATIONS

Samsung, "R2-1802418: New MAC CEs for NR MIMO," 3GPP TSG-RAN WG2 Meeting #101, Feb. 26-Mar. 2, 2018, Athens, Greece, 18 pages.
(Continued)

*Primary Examiner* — Redentor Pasia
(74) *Attorney, Agent, or Firm* — Withrow & Terranova, PLLC

(57) ABSTRACT

Systems and methods for Semi-Persistent Sounding Reference Signal (SP SRS) resource activation or deactivation are disclosed. In some embodiments, a method of operation of a wireless device in a cellular communications network comprises receiving, from a network node, a Medium Access Control (MAC) Control Element (CE). The MAC CE comprises an indication of a SP SRS resource set to be activated or deactivated and information that indicates a spatial relation for the SP SRS resource set to be activated or deactivated. In this manner, a MAC CE for SP SRS resource set activation or deactivation is provided in a manner that gives spatial relation information in an efficient and flexible manner.

15 Claims, 14 Drawing Sheets

Related U.S. Application Data

(60) Provisional application No. 62/631,243, filed on Feb. 15, 2018.

(51) Int. Cl.
  *H04B 7/0456* (2017.01)
  *H04W 56/00* (2009.01)
  *H04W 84/04* (2009.01)

(52) U.S. Cl.
  CPC .......... *H04L 5/0051* (2013.01); *H04L 5/0053* (2013.01); *H04L 5/0098* (2013.01); *H04W 56/001* (2013.01); *H04W 84/042* (2013.01)

(56) References Cited

U.S. PATENT DOCUMENTS

| | | | | |
|---|---|---|---|---|
| 2018/0219606 | A1* | 8/2018 | Ng | H04B 7/0617 |
| 2018/0368142 | A1* | 12/2018 | Liou | H04W 72/0446 |
| 2019/0037426 | A1* | 1/2019 | Yu | H04L 5/0048 |
| 2019/0053288 | A1* | 2/2019 | Zhou | H04L 5/0091 |
| 2019/0058517 | A1* | 2/2019 | Kang | H04B 7/0456 |
| 2019/0058561 | A1* | 2/2019 | Ho | H04B 7/0695 |
| 2019/0075014 | A1* | 3/2019 | Zhou | H04L 41/0654 |
| 2019/0116009 | A1* | 4/2019 | Yum | H04L 1/00 |
| 2019/0141546 | A1* | 5/2019 | Zhou | H04W 24/02 |
| 2019/0150161 | A1* | 5/2019 | Cheng | H04W 72/085 370/330 |
| 2019/0174466 | A1* | 6/2019 | Zhang | H04W 72/042 |
| 2019/0190669 | A1* | 6/2019 | Park | H04W 56/001 |
| 2019/0199496 | A1* | 6/2019 | Qin | H04B 7/0617 |
| 2019/0207737 | A1* | 7/2019 | Babaei | H04W 80/02 |
| 2019/0208436 | A1* | 7/2019 | Zhou | H04W 52/221 |
| 2019/0215130 | A1* | 7/2019 | Aiba | H04L 5/0057 |
| 2019/0215701 | A1* | 7/2019 | Honglei | H04W 16/28 |
| 2019/0215870 | A1* | 7/2019 | Babaei | H04W 72/042 |
| 2019/0215888 | A1* | 7/2019 | Cirik | H04W 76/19 |
| 2019/0215896 | A1* | 7/2019 | Zhou | H04W 76/28 |
| 2019/0215897 | A1* | 7/2019 | Babaei | H04W 76/28 |
| 2019/0379494 | A1* | 12/2019 | Kakishima | H04L 5/0057 |

OTHER PUBLICATIONS

VIVO, "R2-1801995: MAC CEs format for beam management," 3GPP TSG-RAN WG2 Meeting#101, Feb. 26-Mar. 2, 2018, Athens, Greece, 7 pages.

International Search Report and Written Opinion for International Patent Application No. PCT/IB2019/050639, dated Apr. 25, 2019, 14 pages.

Author Unknown, "Technical Specification Group Radio Access Network; Evolved Universal Terrestrial Radio Access (E-UTRA); Medium Access Control (MAC) protocol specification (Release 15)," Technical Specification 36.321, Version 15.0.0, 3GPP Organizational Partners, Dec. 2017, 109 pages.

Author Unknown, "Technical Specification Group Radio Access Network; NR; Physical layer procedures for data (Release 15)," Technical Specification 38.214, Version 15.0.0, 3GPP Organizational Partners, Dec. 2017, 71 pages.

Author Unknown, "Technical Specification Group Radio Access Network; NR; Medium Access Control (MAC) protocol specification (Release 15)," Technical Specification 38.321, Version 15.0.0, 3GPP Organizational Partners, Dec. 2017, 55 pages.

Author Unknown, "Technical Specification Group Radio Access Network; NR Radio Resource Control (RRC) protocol specification (Release 15)," Technical Specification 38.331, Version 15.0.0, 3GPP Organizational Partners, Dec. 2017, 188 pages.

RAN1, "R1-1801272: LS response to RAN2 on MAC CEs for beam management and CSI," Third Generation Partnership Project (3GPP), TSG RAN WG1 Ad Hoc Meeting, Jan. 22-26, 2018, 5 pages, Vancouver, Canada.

Examination Report for Indian Patent Application No. 202047039353, dated Dec. 1, 2021, 6 pages.

Notice of Preliminary Rejection for Korean Patent Application No. 2020-7022333, dated Mar. 10, 2022, 7 pages.

VIVO, "R2-1801994: MAC CEs for beam management," 3GPP TSG-RAN WG2 Meeting #101, Feb. 26-Mar. 2, 2018, Athens, Greece, 10 pages.

VIVO, "R2-1800900: MAC CEs format for beam management," 3GPP TSG-RAN WG2 NR Ad hoc 1801, Jan. 22-26, 2018, Vancouver, Canada, 8 pages.

ZTE, et al., "R2-1801932: MAC CE for activation/deactivation of semi-persistent SRS," 3GPP TSG RAN WG2 Meeting #101, Feb. 26-Mar. 2, 2018, Athens, Greece, 7 pages.

Notice of Reasons for Refusal for Japanese Patent Application No. 2020-540710, dated Nov. 19, 2021, 6 pages.

* cited by examiner

Figure 6.1.3.14-1 of 3GPP TS 36.321: Activation/Deactivation of CSI-RS resources MAC Control Element

FIG. 17

Figure 6.1.3.14-2 of 3GPP TS 36.321: Activation/Deactivation CSI-RS command

| R8 | R7 | R6 | R5 | R4 | R3 | R2 | R1 | Oct 1 |

EFFICIENT MAC CE INDICATION OF SPATIAL RELATION FOR SEMI-PERSISTENT SRS

RELATED APPLICATIONS

The present application is a continuation of International Application No. PCT/IB2019/050639, filed Jan. 25, 2019, which claims priority to Provisional Application No. 62/631,243 filed Feb. 15, 2018, the disclosures of which are incorporated herein by reference in their entireties.

TECHNICAL FIELD

The present disclosure relates to a wireless communication system and, more specifically, to Sounding Reference Signals (SRSs) in a wireless communication system.

BACKGROUND

It is expected that large parts of future New Radio (NR) networks will be deployed for Time Division Duplexing (TDD). One benefit with TDD, as compared to Frequency Division Duplexing (FDD), is that TDD enables reciprocity based beamforming, which can be applied both at the Transmit-Receive Point (TRP) (i.e., for downlink) and the User Equipment device (UE) (i.e., for uplink). For reciprocity based downlink transmission, it is expected that the UE will transmit Sounding Reference Signals (SRSs), which the TRP will use to estimate the channel between the TRP and the UE. The channel estimate will then be used at the TRP to find optimal precoding weights for the coming downlink transmission, for example by using Eigen-beamforming. In a similar way, it is expected that Channel State Information Reference Signal (CSI-RS) will be used as sounding signal for reciprocity based uplink transmissions. It has been agreed in NR that a TRP can indicate a spatial relation assumption to an earlier transmitted downlink reference signal (e.g., CSI-RS and Synchronization Signal Block (SSB)), as well as from an SRS that a UE may use when determining uplink precoding of an SRS resource.

Codebook-Based Uplink Transmission

Multi-antenna techniques can significantly increase the data rates and reliability of a wireless communication system. The performance is in particular improved if both the transmitter and the receiver are equipped with multiple antennas, which results in a Multiple Input Multiple Output (MIMO) communication channel. Such systems and/or related techniques are commonly referred to as MIMO.

The NR standard is currently being specified. A core component in NR is the support of MIMO antenna deployments and MIMO related techniques. It is expected that NR will support uplink MIMO with at least four layer spatial multiplexing using at least four antenna ports with channel dependent precoding. The spatial multiplexing mode is aimed for high data rates in favorable channel conditions. An illustration of the spatial multiplexing operation is provided in FIG. 1 for where Cyclic Prefix Orthogonal Frequency Division Multiplexing (CP-OFDM) is used on the uplink.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and is typically indicated by means of a Transmit Precoder Matrix Indicator (TPMI), which specifies a unique precoder matrix in the codebook for a given number of symbol streams. The r symbols in s each correspond to a layer, and r is referred to as the transmission rank. In this way, spatial multiplexing is achieved since multiple symbols can be transmitted simultaneously over the same Time/Frequency Resource Element (TFRE). The number of symbols r is typically adapted to suit the current channel properties.

The received $N_R \times 1$ vector $y_n$, for a certain TFRE on subcarrier n (or alternatively data TFRE number n) is thus modeled by:

$$y_n = H_n W s_n + e_n \qquad \text{Equation 1}$$

where $e_n$ is a noise/interference vector obtained as realizations of a random process. The precoder W can be a wideband precoder, which is constant over frequency, or frequency selective. However, only wideband precoding indication is supported in uplink for NR Release 15.

The precoder matrix W is often chosen by the NR base station, which is referred to as a next generation or NR base station (gNB), to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the gNB. In addition, the precoder matrix may also be selected to strive for orthogonalizing the channel, meaning that after proper linear equalization at the gNB, the inter-layer interference is reduced.

One example method for a gNB to select a precoder matrix W can be to select the $W_k$ that maximizes the Frobenius norm of the hypothesized equivalent channel:

$$\max_k \|\hat{H}_n W_k\|_F^2 \qquad \text{Equation 2}$$

where:
$\hat{H}_n$ is a channel estimate, possibly derived from SRS;
$W_k$ is a hypothesized precoder matrix with index k; and
$\hat{H}_n W_k$ is the hypothesized equivalent channel.

In closed-loop precoding for the NR uplink, the TRP transmits, based on channel measurements in the reverse link (uplink), TPMI to the UE that the UE should use on its uplink antennas. The gNB configures the UE to transmit SRS according to the number of UE antennas it would like the UE to use for uplink transmission to enable the channel measurements. A single precoder that is supposed to cover a large bandwidth (wideband precoding) may be signaled. It may also be beneficial to match the frequency variations of the channel and instead feed back a frequency-selective precoding report, e.g. several precoders and/or several TPMIs, one per subband.

Information other than TPMI is generally used to determine the uplink MIMO transmission state, such as SRS Resource Indicators (SRIs) as well as Transmission Rank Indicator (TRIs). These parameters, as well as the Modulation and Coding State (MCS), and the uplink resources where Physical Uplink Shared Channel (PUSCH) is to be transmitted, are also determined by channel measurements derived from SRS transmissions from the UE. The transmission rank, and thus the number of spatially multiplexed layers, is reflected in the number of columns of the precoder W. For efficient performance, it is important that a transmission rank that matches the channel properties is selected.

SRS Transmission Setting

How the SRS transmission should be done, for example which SRS resource to use, the number of ports per SRS resource, etc., needs to be signaled to the UE from the TRP. One way to solve this in a low overhead way is to predefine a set of "SRS transmission settings" using higher layer signaling (e.g., Radio Resource Control (RRC)) and then indicate in Downlink Control Information (DCI) which "SRS transmission setting" that the UE should apply. An "SRS transmission setting" can for example contain information regarding which SRS resources and SRS ports that the UE should use in the coming SRS transmission.

Exactly how SRS transmissions are configured and triggered for NR is still under discussion.

SUMMARY

Systems and methods for semi-persistent sounding reference signal resource set activation or deactivation are disclosed. In some embodiments, a method of operation of a wireless device in a cellular communications network comprises receiving, from a network node, a Medium Access Control (MAC) Control Element (CE). The MAC CE comprises an indication of a semi-persistent sounding reference signal resource set to be activated or deactivated and information that indicates a spatial relation for the semi-persistent sounding reference signal resource set to be activated or deactivated. In this manner, a MAC CE for semi-persistent sounding reference signal resource set activation or deactivation is provided in a manner that gives spatial relation information in an efficient and flexible manner.

In some embodiments, the information that indicates the spatial relation comprises an indication of a type of reference signal for which the spatial relation is provided and an identifier of a reference signal resource set for the type of reference signal for which the spatial relation is provided.

In some embodiments, the indication of the type of reference signal indicates that the type of reference signal is a Channel State Information Reference Signal (CSI-RS), a Synchronization Signal Block (SSB), or a Sounding Reference Signal (SRS).

In some other embodiments, the indication of the type of reference signal comprises two bits that indicate the type of reference signal, wherein a first state of the two bits indicates that the type of reference signal is a first type of reference signal, a second state of the two bits indicates that the type of reference signal is a second type of reference signal, and a third state of the two bits indicates that the type of reference signal is a third type of reference signal. In some embodiments, the first type of reference signal is a CSI-RS, the second type of reference signal is a SSB, and the third type of reference signal is a SRS.

In some embodiments, the MAC CE comprises a first octet that comprises the indication of the semi-persistent sounding reference signal resource set to be activated or deactivated and a second octet that comprises the indication of the type of reference signal for which the spatial relation is provided and the identifier of the reference signal resource set for the type of reference signal for which the spatial relation is provided.

In some embodiments, if a first bit in the second octet is set to a first state, the first bit serves as the indication of the type of reference signal for which the spatial relation is provided and the type of reference signal for which the spatial relation is provided is a CSI-RS and remaining bits in the second octet serve as the identifier of the reference signal resource set for the CSI-RS. If the first bit in the second octet is set to a second state and a second bit in the second octet is set to a first state, the first bit and the second bit serve as the indication of the type of reference signal for which the spatial relation is provided and the type of reference signal for which the spatial relation is provided is a SSB and remaining bits in the second octet serve as the identifier of the reference signal resource set for the SSB. If the first bit in the second octet is set to a second state and the second bit in the second octet is set to a second state, the first bit and the second bit serve as the indication of the type of reference signal for which the spatial relation is provided and the type of reference signal for which the spatial relation is provided is a SRS and all but one of the remaining bits in the second octet serve as the identifier of the reference signal resource set for the SRS.

In some other embodiments, a first bit in the second octet is set to a first state such that the first bit serves as the indication of the type of reference signal for which the spatial relation is provided and the type of reference signal for which the spatial relation is provided is a CSI-RS and remaining bits in the second octet serve as the identifier of the reference signal resource set for the CSI-RS.

In some other embodiments, a first bit in the second octet is set to a second state, a second bit in the second octet is set to a first state such that the first bit and the second bit serve as the indication of the type of reference signal for which the spatial relation is provided and the type of reference signal for which the spatial relation is provided is a SSB, and remaining bits in the second octet serve as the identifier of the reference signal resource set for the SSB.

In some other embodiments, a first bit in the second octet is set to a second state, a second bit in the second octet is set to a second state such that the first bit and the second bit serve as the indication of the type of reference signal for which the spatial relation is provided and the type of reference signal for which the spatial relation is provided is a SRS, and all but one of the remaining bits in the second octet serve as the identifier of the reference signal resource set for the SRS.

In some embodiments, the remaining bits in the octet comprise a first set of fields if a first bit of an octet of the MAC CE is set to a first state, the remaining bits in the octet comprise a second set of fields if the first bit of the octet is set to a second state and a second bit of the octet is set to a first state, and the remaining bits in the octet comprise a third set of fields if the first bit of the octet is set to a second state and the second bit of the octet is set to a second state. Further, in some embodiments, the first set of fields comprises a field comprising bits providing an identifier of a CSI-RS resource set for which a spatial relation is indicated. In some embodiments, the second set of fields comprises a field comprising bits providing an identifier of a SSB resource set for which a spatial relation is indicated. In some embodiments, the third set of fields comprises a field comprising bits providing an identifier of a SRS resource set for which a spatial relation is indicated.

In some embodiments, the indication is an indication to activate the semi-persistent sounding reference signal resource set, and the method further comprises transmitting a sounding reference signal on the activated semi-persistent sounding reference signal resource set.

Embodiments of a wireless device are also disclosed. In some embodiments, a wireless device for activating a semi-persistent sounding reference signal resource set for the wireless device in a cellular communications network is adapted to receive, from a network node, a MAC CE comprising an indication of a semi-persistent sounding reference signal resource set to be activated or deactivated and information that indicates a spatial relation for the semi-persistent sounding reference signal resource set to be activated or deactivated.

In some embodiments, a wireless device for activating a semi-persistent sounding reference signal resource set for the wireless device in a cellular communications network comprises an interface comprising radio front end circuitry and processing circuitry associated with the interface. The processing circuitry is configured to cause the wireless device to receive, from a network node via the interface, a MAC CE comprising an indication of a semi-persistent sounding reference signal resource set to be activated or deactivated and information that indicates a spatial relation for the semi-persistent sounding reference signal resource set to be activated or deactivated.

Embodiments of a method of operation of a network node are also disclosed. In some embodiments, a method of operation of a network node for activating a semi-persistent sounding reference signal resource set for a wireless device in a cellular communications network comprises transmitting, to a wireless device, a MAC CE comprising an indication of a semi-persistent sounding reference signal resource set to be activated or deactivated and information that indicates a spatial relation for the semi-persistent sounding reference signal resource set to be activated or deactivated.

In some embodiments, the information that indicates the spatial relation comprises an indication of a type of reference signal for which the spatial relation is provided and an identifier of a reference signal resource set for the type of reference signal for which the spatial relation is provided.

In some embodiments, the indication of the type of reference signal indicates that the type of reference signal is a CSI-RS, a SSB, or a SRS.

In some embodiments, the indication of the type of reference signal comprises two bits that indicate the type of reference signal, wherein a first state of the two bits indicates that the type of reference signal is a first type of reference signal, a second state of the two bits indicates that the type of reference signal is a second type of reference signal, and a third state of the two bits indicates that the type of reference signal is a third type of reference signal. In some embodiments, the first type of reference signal is a CSI-RS, the second type of reference signal is a SSB, and the third type of reference signal is a SRS.

In some embodiments, the MAC CE comprises a first octet that comprises the indication of the semi-persistent sounding reference signal resource set to be activated or deactivated and a second octet that comprises the indication of the type of reference signal for which the spatial relation is provided and the identifier of the reference signal resource set for the type of reference signal for which the spatial relation is provided.

In some embodiments, if a first bit in the second octet is set to a first state, the first bit serves as the indication of the type of reference signal for which the spatial relation is provided and the type of reference signal for which the spatial relation is provided is a CSI-RS and remaining bits in the second octet serve as the identifier of the reference signal resource set for the CSI-RS. If the first bit in the second octet is set to a second state and a second bit in the second octet is set to a first state, the first bit and the second bit serve as the indication of the type of reference signal for which the spatial relation is provided and the type of reference signal for which the spatial relation is provided is a SSB and remaining bits in the second octet serve as the identifier of the reference signal resource set for the SSB. If the first bit in the second octet is set to a second state and the second bit in the second octet is set to a second state, the first bit and the second bit serve as the indication of the type of reference signal for which the spatial relation is provided and the type of reference signal for which the spatial relation is provided is a SRS and all but one of the remaining bits in the second octet serve as the identifier of the reference signal resource set for the SRS.

In some embodiments, a first bit in the second octet is set to a first state such that the first bit serves as the indication of the type of reference signal for which the spatial relation is provided and the type of reference signal for which the spatial relation is provided is a CSI-RS and remaining bits in the second octet serve as the identifier of the reference signal resource set for the CSI-RS.

In some embodiments, a first bit in the second octet is set to a second state, a second bit in the second octet is set to a first state such that the first bit and the second bit serve as the indication of the type of reference signal for which the spatial relation is provided and the type of reference signal for which the spatial relation is provided is a SSB, and remaining bits in the second octet serve as the identifier of the reference signal resource set for the SSB.

In some embodiments, a first bit in the second octet is set to a second state, a second bit in the second octet is set to a second state such that the first bit and the second bit serve as the indication of the type of reference signal for which the spatial relation is provided and the type of reference signal for which the spatial relation is provided is a SRS, and all but one of the remaining bits in the second octet serve as the identifier of the reference signal resource set for the SRS.

In some embodiments, the remaining bits in the octet comprise a first set of fields if a first bit of an octet of the MAC CE is set to a first state, the remaining bits in the octet comprise a second set of fields if the first bit of the octet is set to a second state and a second bit of the octet is set to a first state, and the remaining bits in the octet comprise a third set of fields if the first bit of the octet is set to a second state and the second bit of the octet is set to a second state. In some embodiments, the first set of fields comprises a field comprising bits providing an identifier of a CSI-RS resource set for which a spatial relation is indicated. In some embodiments, the second set of fields comprises a field comprising bits providing an identifier of a SSB resource set for which a spatial relation is indicated. In some embodiments, the third set of fields comprises a field comprising bits providing an identifier of a SRS resource set for which a spatial relation is indicated.

Embodiments of a network node are also disclosed. In some embodiments, a network node for activating a semi-persistent sounding reference signal resource set for a wireless device in a cellular communications network is adapted to transmit, to a wireless device, a MAC CE comprising an indication of a semi-persistent sounding reference signal resource set to be activated or deactivated and information that indicates a spatial relation for the semi-persistent sounding reference signal resource set to be activated or deactivated.

In some embodiments, a network node for activating a semi-persistent sounding reference signal resource set for a wireless device in a cellular communications network comprises an interface and processing circuitry associated with the interface. The processing circuitry is configured to cause the network node to transmit, to a wireless device, a MAC CE comprising an indication of a semi-persistent sounding reference signal resource set to be activated or deactivated and information that indicates a spatial relation for the semi-persistent sounding reference signal resource set to be activated or deactivated.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 17 is a reproduction of FIG. 6.1.3.14-2 of 3GPP TS 36.321, which illustrates activation/deactivation of CSI-RS command.

DETAILED DESCRIPTION

Figure 1:
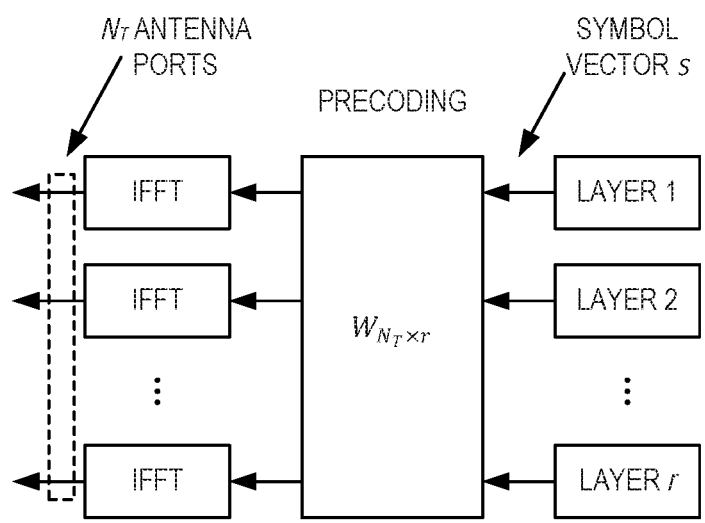
FIG. 1 is an illustration of a spatial multiplexing operation.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a next generation or New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

As noted above, exactly how SRS transmissions are configured and triggered for NR is still under discussion. A text proposal to Third Generation Partnership Project (3GPP) Technical Specification (TS) 38.331 defining the SRS related parameters is given below.

2.1.1.1 SRS-Config

The SRS-Config IE is used to configure sounding reference signal transmissions. The configuration defines a list of SRS-Resources and a list of SRS-ResourceSets. Each resource set defines a set of SRS-Resources. The network triggers the transmission of the set of SRS-Resources using a configured aperiodicSRS-Resource-Trigger (that is carried in physical layer downlink control information, 'L1 DCI').

SRS-Config information element

```
-- ASN1START
-- SRS configuration allowing to add and remove sets of SRS resources
SRS-Config ::=                                          SEQUENCE {
              srs-ResourceSetToReleaseList             (SIZE(0.. maxNrofSRS-
ResourceSets) OF SRS-ResourceSetId   OPTIONAL,         -- Need ON
              srs ResourceSetToAddModList              SEQUENCE (SIZE(0. .maxNrofSRS
```

| SRS-Config information element |
| --- |

```
ResourceSets) OF SRS-ResourceSet        OPTIONAL                    -- Need ON
                    srs-ResourceToReleaseList              SEQUENCE
(SIZE(1. .maxNrofSRS-Resources)) OF SRS-ResourceId         OPTIONAL,         --
Need ON
                    srs-ResourceToAddModList               SEQUENCE
(SIZE(1. .maxNrofSRS-Resources)) OF SRS-Resource           OPTIONAL
                         -- Need ON
                         -- Configuration of simultaneous SRS and PUCCH (see 38.214, section 6.2.1)
                         pucch SRS SimultaneousTransmission     BOOLEAN
}
-- A set of SRS resources
SRS-ResourceSet : :=                                       SEQUENCE {
                    srs-ResourceSetId                          SRS-ResourceSetId
                    srs-ResourceIds                            SEQUENCE
(SIZE(1. .maxNrofSRS-ResourcePerSet)) OF SRS-ResourceId
                         The DCI "code point" upon which the UE shall transmit SRS according to this
SRS resource set configuration.
                         (see 38.214, section x.x.x.x)
                    aperiodicSRS-ResourceTrigger           TYPE_FFS!
}
SRS-ResourceSetId : :=                                     INTEGER (0. .maxNrofSRS-
ResourceStes-1)
SRS-Resource : :=                                          SEQUENCE {
                    srs-ResourceId                             SRS-ResourceId,
                    nrofSRS-Ports                              ENUMERATED {1port,
2ports, 4ports),
                         -- Comb value (2 or 4) and comb offset (see 38.214, section 6.2.1)
                         transmissionComb                      ENUMERATED {n2,
n4},
                         -- OFDM symbol location of the SRS resource within a slot including number of
                         -- OFDM symbols (1, 2, or 4 per SRS resource) (see 38.214, section 6.2.1)
                         resourceMapping                       TYPE_FFS!,
                         -- Includes parameters capturing SRS frequency hoping (see 38.214, section
6.2.1)
                         freqHopping                           TYPE_FFS!,
                         -- Time domain behavior of SRS resource configuration (see 38.214, section
6.2.1)
                         resourceType                          TYPE_FFS!,
                         -- Periodicity and slot offset for periodic/semi-persistent SRS (sec 38.214,
section 6.2.1)
                         slotConfiguration                     TYPE_FFS!,
                         -- Wideband and partial band SRS (see 38.214, section 6.2.1)
                         freqBand                              TYPE_FFS!,
                         -- ADD DESCRIPTION (see 38.214, section 6.2.1)
                         sequenceId                            TYPE_FFS!,
}
SRS-ResourceId : :=                                        INTEGER (0. .maxNrofSRS-
Resources-1)
```

Thus, the RRC configuration of "SRS transmission settings" are done with the Information Element (IE) SRS-Config, which contains a list of SRS-Resources (the list constitutes a "pool" of resources) wherein each SRS resource contains information of the physical mapping of the reference signal on the time-frequency grid, time-domain information, sequence Identifiers (IDs), etc. The SRS-Config also contains a list of SRS resource sets, which contains a list of SRS resources and an associated DCI trigger state. Thus, when a certain DCI state is triggered, it indicates that the SRS resources in the associated set shall be transmitted by the UE.

In NR, the following three types of SRS transmissions are supported:

Periodic SRS (P SRS): SRS is transmitted periodically in certain slots. This SRS transmission is semi-statically configured by the RRC using parameters such as SRS resource, periodicity, and slot offset.

Aperiodic SRS (AP SRS): This is a one-shot SRS transmission that can happen in any slot. Here, one-shot means that SRS transmission only happens once per trigger. The SRS resources (i.e., the resource element locations which consist of subcarrier locations and Orthogonal Frequency Division Multiplexing (OFDM) symbol locations) for AP SRS are semi-statically configured. The transmission of AP SRS is triggered by dynamic signaling through Physical Downlink Control Channel (PDCCH). Multiple AP SRS resources can be grouped into a SRS resource set and the triggering is done on a set level.

Semi-Persistent SRS (SP SRS): Similar to P SRS, resources for SP SRS transmissions are semi-statically configured with parameters such as periodicity and slot offset. However, unlike P SRS, dynamic signaling is needed to activate and possibly deactivate the SRS transmission.

In the case of SP SRS, the gNB first RRC configures the UE with the SP SRS resources. The SP SRS resource set is then activated via Medium Access Control (MAC) Control Element (CE).

NR supports spatial relation indication for SRS resources, where the spatial relation can be either to a downlink Reference Signal (RS) (SSB or CSI-RS) or by the UE previously transmitted SRS. The spatial relation is primarily used to indicate what uplink transmission beam the UE may use for precoding the SRS, i.e. it is a form of uplink beam indication. If a UE is capable of beam correspondence, the uplink beam may be derived from the downlink beam management procedure and a spatial relation to a downlink RS can be indicated, whereon the UE may transmit the SRS in the reciprocal direction to how it set its receive beam when receiving the downlink RS. Alternatively, an uplink beam management procedure can be used, where the UE transmits an SRS beam sweep and the gNB refers back to one of the swept beams in a previously transmitted SRS resource to indicate the spatial relation to the SRS resource. The below table summarizes how the spatial relation to a target SRS resource is indicated for the different time domain behaviors.

| Spatial parameter | Reference RS | Target RS | Signalling mode |
|---|---|---|---|
| Spatial | SSB/CSI-RS (at least P-CSIRS and SP-CSI-RS), P-SRS FFS: AP-CSI-RS, SP-SRS | P SRS | RRC |
| Spatial | SSB/CSI-RS (at least P-CSIRS and SP-CSI-RS), P-SRS/SP-SRS FFS: AP-SRS, AP-CSI-RS | SP-SRS | RRC + MAC-CE |
| Spatial | SSB/CSI-RS (at least P-CSIRS and SP-CSI-RS), P-SRS, SP-SRS, AP-SRS Working assumption: AP-CSI-RS | AP SRS | RRC or RRC + MAC CE for configuration, indication with DCI |

Figure 2:
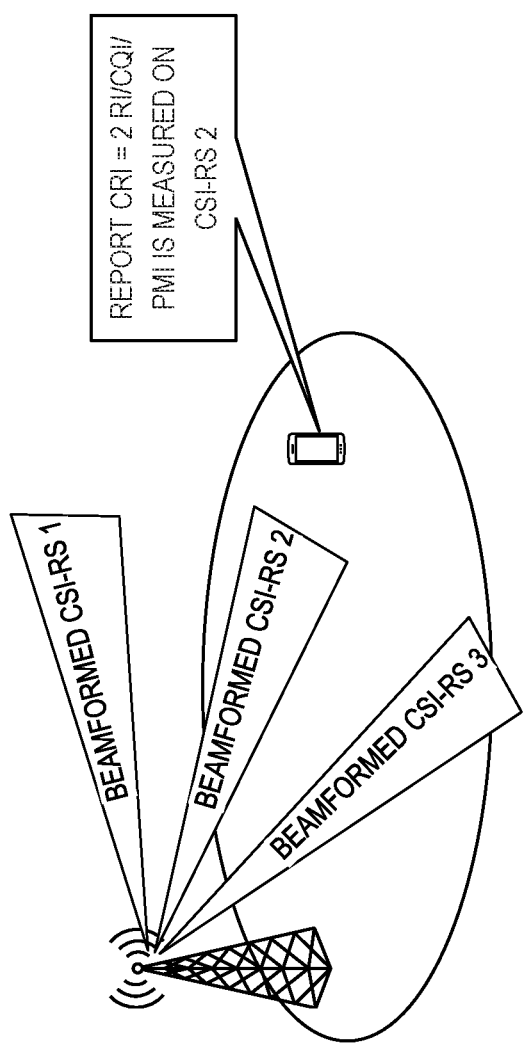
FIG. 2 is an illustration of beamformed Channel State Information Reference Signal (CSI-RS)

MAC CE Activation of CSI-RS is provided in Long Term Evolution (LTE). Release 13 Full Dimension MIMO (FD-MIMO) specification in LTE supports an enhanced CSI-RS reporting called Class B for beamformed CSI-RS. Therein, an LTE RRC_CONNECTED UE can be configured with K beams (where 1<K≤8) where each beam can consist of 1, 2, 4, or 8 CSI-RS ports. For CSI feedback purposes (Precoder Matrix Indicator (PMI), Rank Indicator (RI), and Channel Quality Information (CQI)), there is a CSI-RS Resource Indicator per CSI-RS. As part of the CSI, the UE reports CSI-RS Index (CRI) to indicate the preferred beam where the CRI is wideband. Other CSI components such as RI/CQI/PMI are based on legacy codebook (i.e., Release 12) and CRI reporting periodicity is an integer multiple of the RI reporting periodicity. An illustration of beamformed CSI-RS is given in FIG. 2. In FIG. 2, the UE reports CRI=2 which corresponds to RI/CQI/PMI being computed using 'Beamformed CSI-RS 2'.

For Release 14 enhanced FD-MIMO (eFD-MIMO), non-periodic beamformed CSI-RS with two different sub-flavors was introduced. The two sub-flavors are aperiodic CSI-RS and semi-persistent CSI-RS. In both these flavors, the CSI-RS resources are configured for the UE as in Release 13 with K CSI-RS resources, and MAC CE activation of N out of K CSI-RS resources (N≤K) is specified. Alternatively stated, after the K CSI-RS resources are configured to be aperiodic CSI-RS or semi-persistent CSI-RS, the UE waits for MAC CE activation of N out of K CSI-RS resources. In the case of aperiodic CSI-RS, in addition to MAC CE activation, a DCI trigger is sent to the UE so that one of the activated CSI-RS resources is selected by the UE for CSI computation and subsequent reporting. In the case of semi-persistent CSI-RS, once the CSI-RS resources are activated by the MAC CE, the UE can use the activated CSI-RS resources for CSI computation and reporting.

The MAC CE activation/deactivation command is specified in Section 5.19 of TS 36.321 where the specification text is reproduced below:

The network may activate and deactivate the configured CSI-RS resources of a serving cell by sending the Activation/Deactivation of CSI-RS resources MAC control element described in subclause 6.1.3.14. The configured CSI-RS resources are initially deactivated upon configuration and after a handover.

Figure 16:
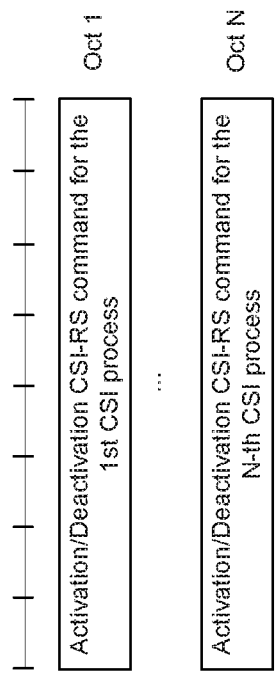
FIG. 16 is a reproduction of FIG. 6.1.3.14-1 of Third Generation Partnership Project (3GPP) Technical Specification (TS) 36.321, which illustrates activation/deactivation of CSI-RS resources MAC CE.

The abovementioned Section 6.1.3.14 of TS 36.321 is reproduced below:

The Activation/Deactivation of CSI-RS resources MAC control element is identified by a MAC PDU subheader with LCID as specified in table 6.2.1-1. It has variable size as the number of configured CSI process (N) and is defined in FIG. 6.1.3.14-1 [See FIG. 16]. Activation/Deactivation CSI-RS command is defined in FIG. 6.1.3.14-2 [See FIG. 17] and activates or deactivates CSI-RS resources for a CSI process. Activation/Deactivation of CSI-RS resources MAC control element applies to the serving cell on which the UE receives the Activation/Deactivation of CSI-RS resources MAC control element.

The Activation/Deactivation of CSI-RS resources MAC control elements is defined as follows:

$R_i$: this field indicates the activation/deactivation status of the CSI-RS resources associated with CSI-RS-ConfigNZPId i for the CSI-RS process. The $R_i$ field is set to "1" to indicate that CSI-RS resource associated with CSI-RS-ConfigNZPId i for the CSI-RS process shall be activated. The $R_i$ field is set to "0" to indicate that the CSI-RS-ConfigNZPId i shall be deactivated;

The MAC activation was introduced in LTE to be able to configure the UE with more CSI-RS resources than the maximum number of CSI-RS resources the UE is able to support for CSI feedback. The MAC CE would then selectively activate up to the maximum number of CSI-RS resources supported by the UE for CSI feedback. The benefit of MAC CE activation for CSI-RS is that the network may, without the need to reconfigure by RRC, activate another set of N CSI-RS resources among the K resources configured for the UE.

There currently exist certain challenge(s). In particular, Medium Access Control (MAC) Control Element (CE) Sounding Reference Signal (SRS) set activation has not been specified in NR, but the requirement is that spatial relation information to both downlink and uplink Reference Signals (RSs) needs to be conveyed.

Certain aspects of the present disclosure and their embodiments may provide solutions to these or other challenges. Systems and methods are disclosed herein for efficiently indicating spatial relations for a Semi-Persistent SRS (SP SRS) resource(s) in MAC CE, e.g., using 1-2 bit format field together with resource identifier (ID) that has varying size to fill a MAC CE octet. In some embodiments, the format field ranges from 1 to 2 bits, instead of the common 2 bits since there are three types of identifiers. This allows for the format field and the identifier to fit in one octet.

Certain embodiments may provide one or more of the following technical advantage(s). MAC CE for SRS resource set activation is provided in a manner that gives Quasi Co-Location (QCL) information per resource in the resource set in an efficient and flexible manner due to the disclosed format indicator presented herein.

Two example embodiments are described below. The difference between these embodiments is in how the size of the format (F) field is captured. The mechanism in the receiver of the MAC CE would be the same. In the first embodiment, the size of the F field is described as 1 bit. In the second embodiment, the size of the F field is 2 bits. Note that these example embodiments are only examples. Other variations may be used, as will be apparent to one of skill in the art upon reading the present disclosure.

Figure 3:
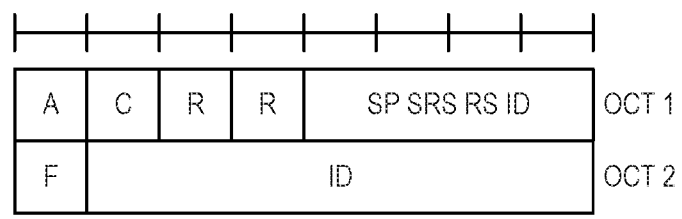
FIG. 3 illustrates a Medium Access Control (MAC) Control Element (CE) in accordance with a first embodiment of the present disclosure.

In a first embodiment, SP SRS activation or deactivation (denoted herein as activation/deactivation) is provided via a MAC CE as described below. As described, the MAC CE also provides an indication of a spatial relation for the activated/deactivated SP SRS resource. While the term SP SRS "resource" is sometimes used herein, it is to be understood that the SP SRS resource can be, at least in some embodiments, an SP SRS "resource set". The design of the MAC CE in accordance with the first embodiment is shown in FIG. 3.

This MAC CE is of fixed size and has the following fields:
- A: Indicates whether the MAC CE is for Activation (set to "1") or Deactivation (set to "0"). The size of the field is 1 bit. The A field is also referred to herein as an "activation" field or an "activation/deactivation" field.
- C: Indicates whether the MAC CE is for the normal uplink carrier (set to "1") or the supplementary uplink carrier (set to "0"). The size of the field is 1 bit. The C field is also referred to herein as a "carrier" field.
- F: Indicates which ID is present in the ID field. If this field is set to "1" then the ID field contains a 7-bit CSI-RS resource ID. If this field is set to "0," then if the first bit of the ID field is "1," then the remaining 6 bits of the ID field contain a 6-bit Synchronization Signal Block (SSB) ID. If this field is set to "0," then if the first bit of the ID field is "0," then the remaining 6 bits of the ID field contain one reserved bit and a 5-bit SRS resource ID. The size of this field is 1 bit. The F field is also referred to herein as the "format" field.
- ID: This field carries the ID as indicated by the F field. The MAC entity shall ignore this field if the A field is set to "0." The size of the field is 7 bits.

In alternatives of the first embodiment, the meaning of the bits are switched such that if the F field is set to "0" then the ID field contains a 7-bit CSI-RS resource ID while if the F field is set to "1," then if the first bit of the ID field is "0" the remaining 6 bits of the ID field contain a 6-bit SSB ID, and so forth.

Figure 4:
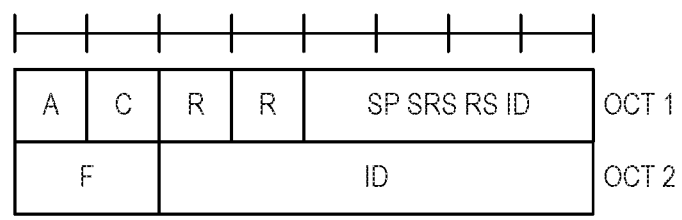
FIG. 4 illustrates a MAC CE in accordance with a second embodiment of the present disclosure.

In a second embodiment, SP SRS activation/deactivation is provided via a MAC CE as described below. As described, the MAC CE also provides an indication of a spatial relation for the activated/deactivated SP SRS resource. The design of the MAC CE for the second embodiment is shown in FIG. 4.

This MAC CE is of fixed size and has the following fields:
- A: Indicates whether the MAC CE is for Activation (set to "1") or Deactivation (set to "0"). The size of the field is 1 bit. The A field is also referred to herein as an "activation" field or an "activation/deactivation" field.
- C: Indicates whether the MAC CE is for the normal uplink carrier (set to "1") or the supplementary uplink carrier (set to "0"). The size of the field is 1 bit. The C field is also referred to herein as the "carrier" field.
- F: Indicates which ID is present in the ID field. If the first bit of this field is set to "1," then the ID field contains six of the seven bits of a CSI-RS resource ID. Together with the second bit of this field, the full 7-bit CSI-RS resource ID can be constructed. If this field is set to "01," then the ID field contains a SSB ID. If this field is set to "00," then the ID field contains 1 R-bit and a 5-bit SRS resource ID. The size of this field is 2 bits. The F field is also referred to herein as the "format" field.
- ID: This field carries the ID as indicated by the F field. The MAC entity shall ignore this field if the A field is set to 0. The size of the field is 7 bits.

Common Part for Both Alternatives

Both the first embodiment and the second embodiment include the following common aspects. For example, the format field fits in 8 bits together with the resource ID. This is constructed as follows. The MAC CE octet has 8 bits, and one of the following is transmitted:
- SSB ID (the size of ID<=6 bits)
- SRS resource ID (the size of ID<=5 bits)
- Channel State Information RS (CSI-RS) resource ID (the size of ID<=7 bits)

The common solution is to have a 2-bit format field with four codepoints to indicate which type the following field has, i.e., which one of the above is signaled. But that becomes 2+7=9 bits. Embodiments of the present disclosure enable both the format indicator and the resource ID to be fit into the 8-bit octet of the MAC CE. For example:
For the whole octet (F+ID):
  If the first bit is set to 1:
    The remaining 7 bits are CSI-RS resource ID.
  Else if the first bit (F field) is set to 0:
    If the second bit (first bit of ID field) is set to 1:
      The remaining 6 bits are SSB ID.
    If the second bit (first bit of ID field) is set to 0:
      There is one reserved bit, and the remaining 5 bits are SRS resource ID.

Figure 5:
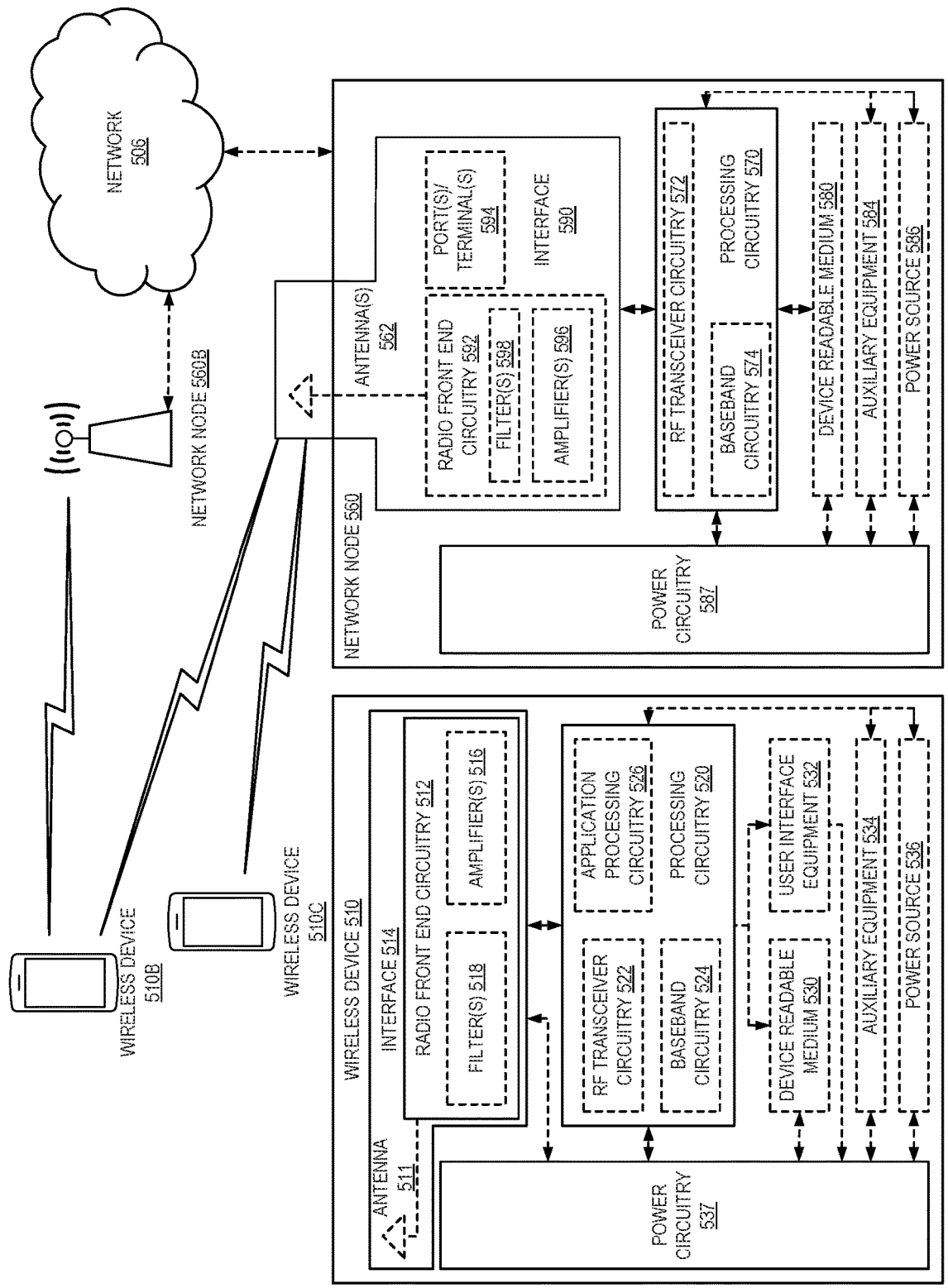
FIG. 5 illustrates an example of a wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts a network 506, network nodes 560 and 560B, and Wireless Devices (WDs) 510, 510B, and 510C. In practice, a wireless network may further include any additional elements suitable to support communication between wireless devices or between a wireless device and another communication device, such as a landline telephone, a service provider, or any other network node or end device. Of the illustrated components, the network node 560 and the WD 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

The network 506 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 560 and the WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs), Base Stations (BSs) (e.g., radio base stations, Node Bs, eNBs, and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), core network nodes (e.g., Mobile Switching Centers (MSCs), MMEs), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, the network node 560 includes processing circuitry 570, a device readable medium 580, an interface 590, auxiliary equipment 584, a power source 586, power circuitry 587, and an antenna 562. Although the network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 560 are depicted as single boxes located within a larger box, or nested within multiple boxes, in practice, a network node may comprise multiple different physical components that make up a single illustrated component (e.g., the device readable medium 580 may comprise multiple separate hard drives as well as multiple Random Access Memory (RAM) modules).

Similarly, the network node 560 may be composed of multiple physically separate components (e.g., a Node B component and a RNC component, or a BTS component and a BSC component, etc.), which may each have their own respective components. In certain scenarios in which the network node 560 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 560 may be configured to support multiple Radio Access Technologies (RATs). In such embodiments, some components may be duplicated (e.g., a separate device readable medium 580 for the different RATs) and some components may be reused (e.g., the same antenna 562 may be shared by the RATs). The network node 560 may also include multiple sets of the various illustrated components for different wireless technologies integrated into the network node 560, such as, for example, GSM, Wideband Code Division Multiple Access (WCDMA), LTE, NR, WiFi, or Bluetooth wireless technologies. These wireless technologies may be integrated into the same or a different chip or set of chips and other components within the network node 560.

The processing circuitry 570 is configured to perform any determining, calculating, or similar operations (e.g., certain obtaining operations) described herein as being provided by a network node. These operations performed by the processing circuitry 570 may include processing information obtained by the processing circuitry 570 by, for example, converting the obtained information into other information, comparing the obtained information or converted information to information stored in the network node, and/or performing one or more operations based on the obtained information or converted information, and as a result of said processing making a determination.

The processing circuitry 570 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 560 components, such as the device readable medium 580, network node 560 functionality. For example, the processing circuitry 570 may execute instructions stored in the device readable medium 580 or in memory within the processing circuitry 570. Such functionality may include providing any of the various wireless features, functions, or benefits discussed herein. In some embodiments, the processing circuitry 570 may include a System on a Chip (SOC).

In some embodiments, the processing circuitry 570 may include one or more of Radio Frequency (RF) transceiver circuitry 572 and baseband processing circuitry 574. In some embodiments, the RF transceiver circuitry 572 and the baseband processing circuitry 574 may be on separate chips (or sets of chips), boards, or units, such as radio units and digital units. In alternative embodiments, part or all of the RF transceiver circuitry 572 and the baseband processing circuitry 574 may be on the same chip or set of chips, boards, or units.

In certain embodiments, some or all of the functionality described herein as being provided by a network node, base station, eNB, or other such network device may be performed by the processing circuitry 570 executing instructions stored on the device readable medium 580 or memory within the processing circuitry 570. In alternative embodiments, some or all of the functionality may be provided by the processing circuitry 570 without executing instructions stored on a separate or discrete device readable medium, such as in a hard-wired manner. In any of those embodiments, whether executing instructions stored on a device readable storage medium or not, the processing circuitry 570 can be configured to perform the described functionality. The benefits provided by such functionality are not limited to the processing circuitry 570 alone or to other components of the network node 560, but are enjoyed by the network node 560 as a whole, and/or by end users and the wireless network generally.

The device readable medium 580 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 570. The device readable medium 580 may store any suitable instructions; data or information, including a computer program; software; an application including one or more of logic, rules, code, tables, etc.; and/or other instructions capable of being executed by the processing circuitry 570 and utilized by the network node 560. The device readable medium 580 may be used to store any calculations made by the processing circuitry 570 and/or any data received via the interface 590. In some embodiments, the processing circuitry 570 and the device readable medium 580 may be considered to be integrated.

The interface 590 is used in the wired or wireless communication of signaling and/or data between the network node 560, a network 506, and/or WDs 510. As illustrated, the interface 590 comprises port(s)/terminal(s) 594 to send and receive data, for example to and from the network 506 over a wired connection. The interface 590 also includes radio front end circuitry 592 that may be coupled to, or in certain embodiments a part of, the antenna 562. The radio front end circuitry 592 comprises filters 598 and amplifiers 596. The radio front end circuitry 592 may be connected to the antenna 562 and the processing circuitry 570. The radio front end circuitry 592 may be configured to condition signals communicated between the antenna 562 and the processing circuitry 570. The radio front end circuitry 592 may receive digital data that is to be sent out to other network nodes or WDs via a wireless connection. The radio front end circuitry 592 may convert the digital data into a radio signal having the appropriate channel and bandwidth parameters using a combination of the filters 598 and/or the amplifiers 596. The radio signal may then be transmitted via the antenna 562. Similarly, when receiving data, the antenna 562 may collect radio signals which are then converted into digital data by the radio front end circuitry 592. The digital data may be passed to the processing circuitry 570. In other embodiments, the interface 590 may comprise different components and/or different combinations of components.

In certain alternative embodiments, the network node 560 may not include separate radio front end circuitry 592; instead, the processing circuitry 570 may comprise radio front end circuitry and may be connected to the antenna 562 without separate radio front end circuitry 592. Similarly, in some embodiments, all or some of the RF transceiver circuitry 572 may be considered a part of the interface 590. In still other embodiments, the interface 590 may include the one or more ports or terminals 594, the radio front end circuitry 592, and the RF transceiver circuitry 572 as part of a radio unit (not shown), and the interface 590 may communicate with the baseband processing circuitry 574, which is part of a digital unit (not shown).

The antenna 562 may include one or more antennas, or antenna arrays, configured to send and/or receive wireless signals. The antenna 562 may be coupled to the radio front end circuitry 592 and may be any type of antenna capable of transmitting and receiving data and/or signals wirelessly. In some embodiments, the antenna 562 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 562 may be separate from the network node 560 and may be connectable to the network node 560 through an interface or port.

The antenna 562, the interface 590, and/or the processing circuitry 570 may be configured to perform any receiving operations and/or certain obtaining operations described herein as being performed by a network node. Any information, data, and/or signals may be received from a WD, another network node, and/or any other network equipment. Similarly, the antenna 562, the interface 590, and/or the processing circuitry 570 may be configured to perform any transmitting operations described herein as being performed by a network node. Any information, data, and/or signals may be transmitted to a WD, another network node, and/or any other network equipment.

The power circuitry 587 may comprise, or be coupled to, power management circuitry and is configured to supply the components of the network node 560 with power for performing the functionality described herein. The power circuitry 587 may receive power from the power source 586. The power source 586 and/or the power circuitry 587 may be configured to provide power to the various components of the network node 560 in a form suitable for the respective components (e.g., at a voltage and current level needed for each respective component). The power source 586 may either be included in, or be external to, the power circuitry 587 and/or the network node 560. For example, the network node 560 may be connectable to an external power source (e.g., an electricity outlet) via an input circuitry or interface such as an electrical cable, whereby the external power source supplies power to the power circuitry 587. As a further example, the power source 586 may comprise a source of power in the form of a battery or battery pack which is connected to, or integrated in, the power circuitry 587. The battery may provide backup power should the external power source fail. Other types of power sources, such as photovoltaic devices, may also be used.

Alternative embodiments of the network node 560 may include additional components beyond those shown in FIG. 5 that may be responsible for providing certain aspects of the network node's functionality, including any of the functionality described herein and/or any functionality necessary to support the subject matter described herein. For example, the network node 560 may include user interface equipment to allow input of information into the network node 560 and to allow output of information from the network node 560. This may allow a user to perform diagnostic, maintenance, repair, and other administrative functions for the network node 560.

As used herein, WD refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A WD may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a MTC device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 5, a WD 510 includes an antenna 511, an interface 514, processing circuitry 520, a device readable medium 530, user interface equipment 532, auxiliary equipment 534, a power source 536, and power circuitry 537. The WD 510 may include multiple sets of one or more of the illustrated components for different wireless technologies supported by the WD 510, such as, for example, GSM, WCDMA, LTE, NR, WiFi, WiMAX, or Bluetooth wireless technologies, just to mention a few. These wireless technologies may be integrated into the same or different chips or set of chips as other components within the WD 510.

The antenna 511 may include one or more antennas or antenna arrays configured to send and/or receive wireless signals and is connected to the interface 514. In certain alternative embodiments, the antenna 511 may be separate from the WD 510 and be connectable to the WD 510 through an interface or port. The antenna 511, the interface 514, and/or the processing circuitry 520 may be configured to perform any receiving or transmitting operations described herein as being performed by a WD. Any information, data, and/or signals may be received from a network node and/or another WD. In some embodiments, radio front end circuitry and/or the antenna 511 may be considered an interface.

As illustrated, the interface 514 comprises radio front end circuitry 512 and the antenna 511. The radio front end circuitry 512 comprises one or more filters 518 and amplifiers 516. The radio front end circuitry 512 is connected to the antenna 511 and the processing circuitry 520 and is configured to condition signals communicated between the antenna 511 and the processing circuitry 520. The radio front end circuitry 512 may be coupled to or be a part of the antenna 511. In some embodiments, the WD 510 may not include separate radio front end circuitry 512; rather, the processing circuitry 520 may comprise radio front end circuitry and may be connected to the antenna 511. Similarly, in some embodiments, some or all of RF transceiver circuitry 522 may be considered a part of the interface 514. The radio front end circuitry 512 may receive digital data that is to be sent out to other network nodes or WDs via a wireless connection. The radio front end circuitry 512 may convert the digital data into a radio signal having the appropriate channel and bandwidth parameters using a combination of the filters 518 and/or the amplifiers 516. The radio signal may then be transmitted via the antenna 511. Similarly, when receiving data, the antenna 511 may collect radio signals which are then converted into digital data by the radio front end circuitry 512. The digital data may be passed to the processing circuitry 520. In other embodiments, the interface 514 may comprise different components and/or different combinations of components.

The processing circuitry 520 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 510 components, such as the device readable medium 530, WD 510 functionality. Such functionality may include providing any of the various wireless features or benefits discussed herein. For example, the processing circuitry 520 may execute instructions stored in the device readable medium 530 or in memory within the processing circuitry 520 to provide the functionality disclosed herein.

As illustrated, the processing circuitry 520 includes one or more of the RF transceiver circuitry 522, baseband processing circuitry 524, and application processing circuitry 526. In other embodiments, the processing circuitry 520 may comprise different components and/or different combinations of components. In certain embodiments, the processing circuitry 520 of the WD 510 may comprise a SOC. In some embodiments, the RF transceiver circuitry 522, the baseband processing circuitry 524, and the application processing circuitry 526 may be on separate chips or sets of chips. In alternative embodiments, part or all of the baseband processing circuitry 524 and the application processing circuitry 526 may be combined into one chip or set of chips, and the RF transceiver circuitry 522 may be on a separate chip or set of chips. In still alternative embodiments, part or all of the RF transceiver circuitry 522 and the baseband processing circuitry 524 may be on the same chip or set of chips, and the application processing circuitry 526 may be on a separate chip or set of chips. In yet other alternative embodiments, part or all of the RF transceiver circuitry 522, the baseband processing circuitry 524, and the application processing circuitry 526 may be combined in the same chip or set of chips. In some embodiments, the RF transceiver circuitry 522 may be a part of the interface 514. The RF transceiver circuitry 522 may condition RF signals for the processing circuitry 520.

In certain embodiments, some or all of the functionality described herein as being performed by a WD may be provided by the processing circuitry 520 executing instructions stored on the device readable medium 530, which in certain embodiments may be a computer-readable storage medium. In alternative embodiments, some or all of the functionality may be provided by the processing circuitry 520 without executing instructions stored on a separate or discrete device readable storage medium, such as in a hard-wired manner. In any of those particular embodiments, whether executing instructions stored on a device readable storage medium or not, the processing circuitry 520 can be configured to perform the described functionality. The benefits provided by such functionality are not limited to the processing circuitry 520 alone or to other components of the WD 510, but are enjoyed by the WD 510 as a whole, and/or by end users and the wireless network generally.

The processing circuitry 520 may be configured to perform any determining, calculating, or similar operations (e.g., certain obtaining operations) described herein as being performed by a WD. These operations, as performed by the processing circuitry 520, may include processing information obtained by the processing circuitry 520 by, for example, converting the obtained information into other information, comparing the obtained information or converted information to information stored by the WD 510, and/or performing one or more operations based on the obtained information or converted information, and as a result of said processing making a determination.

The device readable medium 530 may be operable to store a computer program; software; an application including one or more of logic, rules, code, tables, etc.; and/or other instructions capable of being executed by the processing circuitry 520. The device readable medium 530 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 520. In some embodiments, the processing circuitry 520 and the device readable medium 530 may be considered to be integrated.

The user interface equipment 532 may provide components that allow for a human user to interact with the WD 510. Such interaction may be of many forms, such as visual, audial, tactile, etc. The user interface equipment 532 may be operable to produce output to the user and to allow the user to provide input to the WD 510. The type of interaction may vary depending on the type of user interface equipment 532 installed in the WD 510. For example, if the WD 510 is a smart phone, the interaction may be via a touch screen; if the WD 510 is a smart meter, the interaction may be through a screen that provides usage (e.g., the number of gallons used) or a speaker that provides an audible alert (e.g., if smoke is detected). The user interface equipment 532 may include input interfaces, devices and circuits, and output interfaces, devices and circuits. The user interface equipment 532 is configured to allow input of information into the WD 510, and is connected to the processing circuitry 520 to allow the processing circuitry 520 to process the input information. The user interface equipment 532 may include, for example, a microphone, a proximity or other sensor, keys/buttons, a touch display, one or more cameras, a Universal Serial Bus (USB) port, or other input circuitry. The user interface equipment 532 is also configured to allow output of information from the WD 510 and to allow the processing circuitry 520 to output information from the WD 510. The user interface equipment 532 may include, for example, a speaker, a display, vibrating circuitry, a USB port, a headphone interface, or other output circuitry. Using one or more input and output interfaces, devices, and circuits of the user interface equipment 532, the WD 510 may communicate with end users and/or the wireless network, and allow them to benefit from the functionality described herein.

The auxiliary equipment 534 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 534 may vary depending on the embodiment and/or scenario.

The power source 536 may, in some embodiments, be in the form of a battery or battery pack. Other types of power sources, such as an external power source (e.g., an electricity outlet), photovoltaic devices, or power cells may also be used. The WD 510 may further comprise the power circuitry 537 for delivering power from the power source 536 to the various parts of the WD 510 which need power from the power source 536 to carry out any functionality described or indicated herein. The power circuitry 537 may in certain embodiments comprise power management circuitry. The power circuitry 537 may additionally or alternatively be operable to receive power from an external power source, in which case the WD 510 may be connectable to the external power source (such as an electricity outlet) via input circuitry or an interface such as an electrical power cable. The power circuitry 537 may also in certain embodiments be operable to deliver power from an external power source to the power source 536. This may be, for example, for the charging of the power source 536. The power circuitry 537 may perform any formatting, converting, or other modification to the power from the power source 536 to make the power suitable for the respective components of the WD 510 to which power is supplied.

Figure 6:
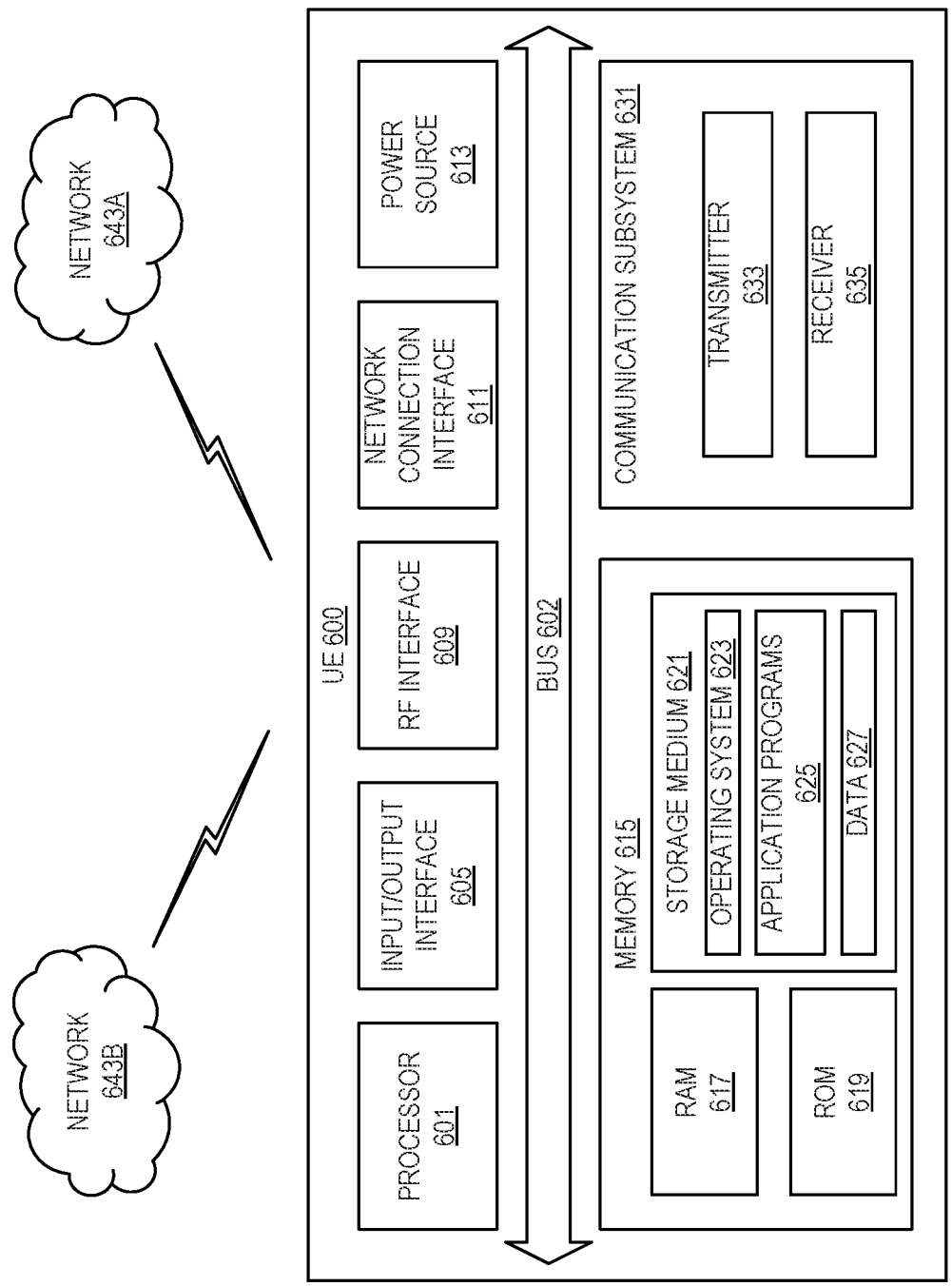
FIG. 6 illustrates one example of a User Equipment device (UE) in which embodiments of the present disclosure may be implemented.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 600 may be any UE identified by 3GPP, including a NB-IoT UE, a MTC UE, and/or an enhanced MTC (eMTC) UE. The UE 600, as illustrated in FIG. 6, is one example of a WD configured for communication in accordance with one or more communication standards promulgated by 3GPP, such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, the UE 600 includes processing circuitry 601 that is operatively coupled to an input/output interface 605, an RF interface 609, a network connection interface 611, memory 615 including RAM 617, ROM 619, and a storage medium 621 or the like, a communication subsystem 631, a power source 613, and/or any other component, or any combination thereof. The storage medium 621 includes an operating system 623, an application program 625, and data 627. In other embodiments, the storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, the processing circuitry 601 may be configured to process computer instructions and data. The processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 601 may include two CPUs. Data may be information in a form suitable for use by a computer.

In the depicted embodiment, the input/output interface 605 may be configured to provide a communication interface to an input device, output device, or input and output device. The UE 600 may be configured to use an output device via the input/output interface 605. An output device may use the same type of interface port as an input device. For example, a USB port may be used to provide input to and output from the UE 600. The output device may be a speaker, a sound card, a video card, a display, a monitor, a printer, an actuator, an emitter, a smartcard, another output device, or any combination thereof. The UE 600 may be configured to use an input device via the input/output interface 605 to allow a user to capture information into the UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, the RF interface 609 may be configured to provide a communication interface to RF components such as a transmitter, a receiver, and an antenna. The network connection interface 611 may be configured to provide a communication interface to a network 643A. The network 643A may encompass wired and/or wireless networks such as a LAN, a WAN, a computer network, a wireless network, a telecommunications network, another like network or any combination thereof. For example, the network 643A may comprise a WiFi network. The network connection interface 611 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 611 may implement receiver and transmitter functionality appropriate to the communication network links (e.g., optical, electrical, and the like). The transmitter and receiver functions may share circuit components, software, or firmware, or alternatively may be implemented separately.

The RAM 617 may be configured to interface via a bus 602 to the processing circuitry 601 to provide storage or caching of data or computer instructions during the execution of software programs such as the operating system, application programs, and device drivers. The ROM 619 may be configured to provide computer instructions or data to the processing circuitry 601. For example, the ROM 619 may be configured to store invariant low-level system code or data for basic system functions such as basic Input and Output (I/O), startup, or reception of keystrokes from a keyboard that are stored in a non-volatile memory. The storage medium 621 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 621 may be configured to include the operating system 623, the application program 625 such as a web browser application, a widget or gadget engine, or another application, and the data file 627. The storage medium 621 may store, for use by the UE 600, any of a variety of various operating systems or combinations of operating systems.

The storage medium 621 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 621 may allow the UE 600 to access computer-executable instructions, application programs, or the like, stored on transitory or non-transitory memory media, to off-load data or to upload data. An article of manufacture, such as one utilizing a communication system, may be tangibly embodied in the storage medium 621, which may comprise a device readable medium.

In FIG. 6, the processing circuitry 601 may be configured to communicate with a network 643B using the communication subsystem 631. The network 643A and the network 643B may be the same network or networks or different network or networks. The communication subsystem 631 may be configured to include one or more transceivers used to communicate with the network 643B. For example, the communication subsystem 631 may be configured to include one or more transceivers used to communicate with one or more remote transceivers of another device capable of wireless communication such as another WD, UE, or base station of a Radio Access Network (RAN) according to one or more communication protocols, such as IEEE 802.6, Code Division Multiple Access (CDMA), WCDMA, GSM, LTE, Universal Terrestrial RAN (UTRAN), WiMax, or the like. Each transceiver may include a transmitter 633 and/or a receiver 635 to implement transmitter or receiver functionality, respectively, appropriate to the RAN links (e.g., frequency allocations and the like). Further, the transmitter 633 and the receiver 635 of each transceiver may share circuit components, software, or firmware, or alternatively may be implemented separately.

In the illustrated embodiment, the communication functions of the communication subsystem 631 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 631 may include cellular communication, WiFi communication, Bluetooth communication, and GPS communication. The network 643B may encompass wired and/or wireless networks such as a LAN, a WAN, a computer network, a wireless network, a telecommunications network, another like network, or any combination thereof. For example, the network 643B may be a cellular network, a WiFi network, and/or a near-field network. A power source 613 may be configured to provide Alternating Current (AC) or Direct Current (DC) power to components of the UE 600.

The features, benefits, and/or functions described herein may be implemented in one of the components of the UE 600 or partitioned across multiple components of the UE 600. Further, the features, benefits, and/or functions described herein may be implemented in any combination of hardware, software, or firmware. In one example, the communication subsystem 631 may be configured to include any of the components described herein. Further, the processing circuitry 601 may be configured to communicate with any of such components over the bus 602. In another example, any of such components may be represented by program instructions stored in memory that, when executed by the processing circuitry 601, perform the corresponding functions described herein. In another example, the functionality of any of such components may be partitioned between the processing circuitry 601 and the communication subsystem 631. In another example, the non-computationally intensive functions of any of such components may be implemented in software or firmware and the computationally intensive functions may be implemented in hardware.

Figure 7:
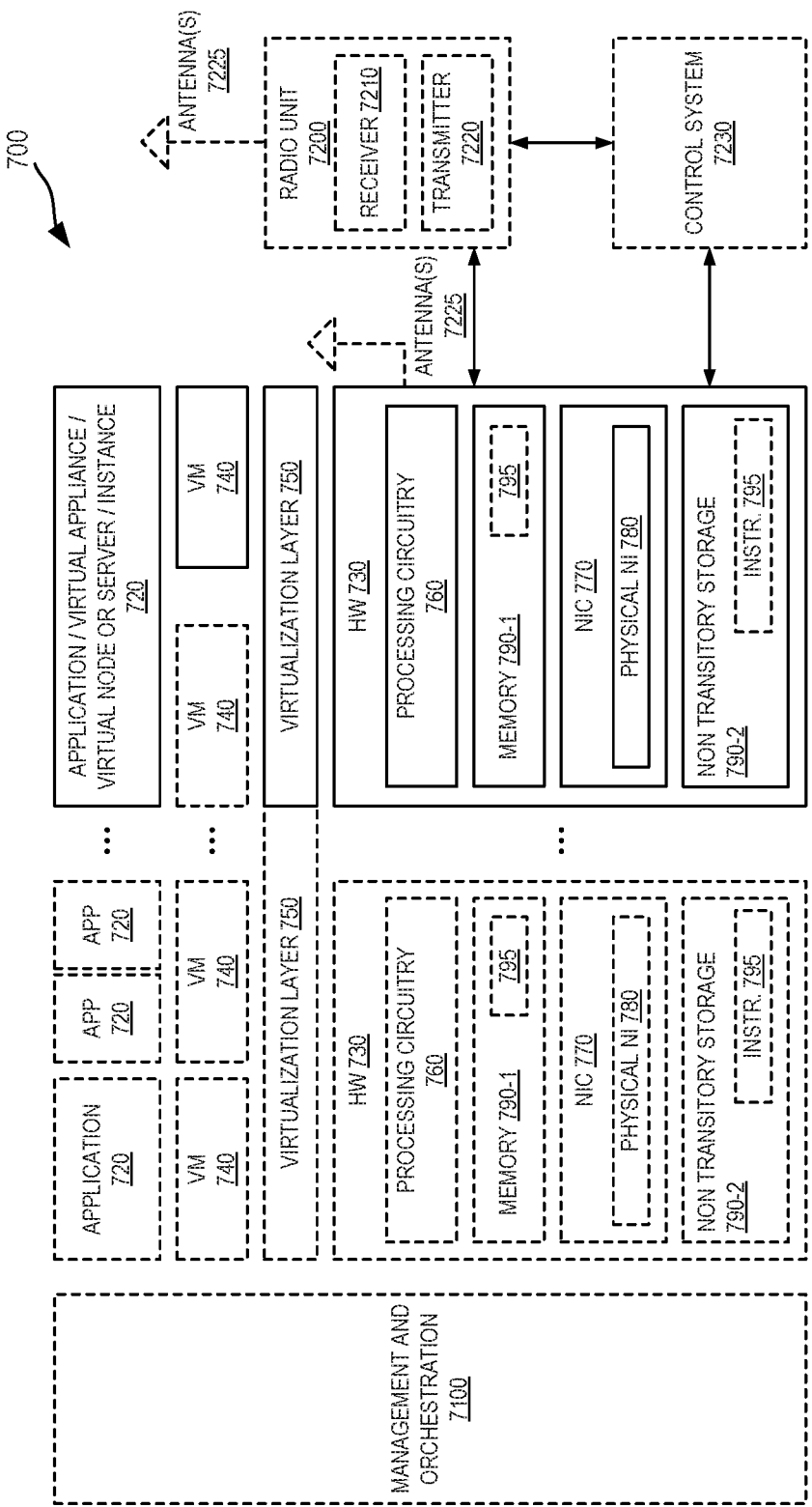
FIG. 7 is a schematic block diagram illustrating a virtualization environment in which functions implemented by some embodiments of the present disclosure may be virtualized.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a WD, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. The applications 720 are run in the virtualization environment 700 which provides hardware 730 comprising processing circuitry 760 and memory 790. The memory 790 contains instructions 795 executable by the processing circuitry 760 whereby the application 720 is operative to provide one or more of the features, benefits, and/or functions disclosed herein.

The virtualization environment 700 comprises general-purpose or special-purpose network hardware devices 730 comprising a set of one or more processors or processing circuitry 760, which may be Commercial Off-the-Shelf (COTS) processors, dedicated ASICs, or any other type of processing circuitry including digital or analog hardware components or special purpose processors. Each hardware device 730 may comprise memory 790-1 which may be non-persistent memory for temporarily storing instructions 795 or software executed by the processing circuitry 760. Each hardware device 730 may comprise one or more Network Interface Controllers (NICs) 770, also known as network interface cards, which include a physical network interface 780. Each hardware device 730 may also include non-transitory, persistent, machine-readable storage media 790-2 having stored therein software 795 and/or instructions executable by the processing circuitry 760. The software 795 may include any type of software including software for instantiating one or more virtualization layers 750 (also referred to as hypervisors), software to execute virtual machines 740, as well as software allowing it to execute functions, features, and/or benefits described in relation with some embodiments described herein.

The virtual machines 740, comprise virtual processing, virtual memory, virtual networking or interface, and virtual storage, and may be run by a corresponding virtualization layer 750 or hypervisor. Different embodiments of the instance of virtual appliance 720 may be implemented on one or more of the virtual machines 740, and the implementations may be made in different ways.

During operation, the processing circuitry 760 executes the software 795 to instantiate the hypervisor or virtualization layer 750, which may sometimes be referred to as a Virtual Machine Monitor (VMM). The virtualization layer 750 may present a virtual operating platform that appears like networking hardware to the virtual machine 740.

As shown in FIG. 7, the hardware 730 may be a stand-alone network node with generic or specific components. The hardware 730 may comprise an antenna 7225 and may implement some functions via virtualization. Alternatively, the hardware 730 may be part of a larger cluster of hardware (e.g., such as in a data center or CPE) where many hardware nodes work together and are managed via a Management and Orchestration (MANO) 7100, which, among others, oversees lifecycle management of the applications 720.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 740 may be a software implementation of a physical machine that runs programs as if they were executing on a physical, non-virtualized machine. Each of the virtual machines 740, and that part of the hardware 730 that executes that virtual machine 740, be it hardware dedicated to that virtual machine 740 and/or hardware shared by that virtual machine 740 with others of the virtual machines 740, forms a separate Virtual Network Element (VNE).

Still in the context of NFV, Virtual Network Function (VNF) is responsible for handling specific network functions that run in one or more virtual machines 740 on top of the hardware networking infrastructure 730 and corresponds to the application 720 in FIG. 7.

In some embodiments, one or more radio units 7200 that each include one or more transmitters 7220 and one or more receivers 7210 may be coupled to the one or more antennas 7225. The radio units 7200 may communicate directly with the hardware nodes 730 via one or more appropriate network interfaces and may be used in combination with the virtual components to provide a virtual node with radio capabilities, such as a radio access node or a base station.

In some embodiments, some signaling can be effected with the use of a control system 7230, which may alternatively be used for communication between the hardware nodes 730 and the radio unit 7200.

Figure 8:
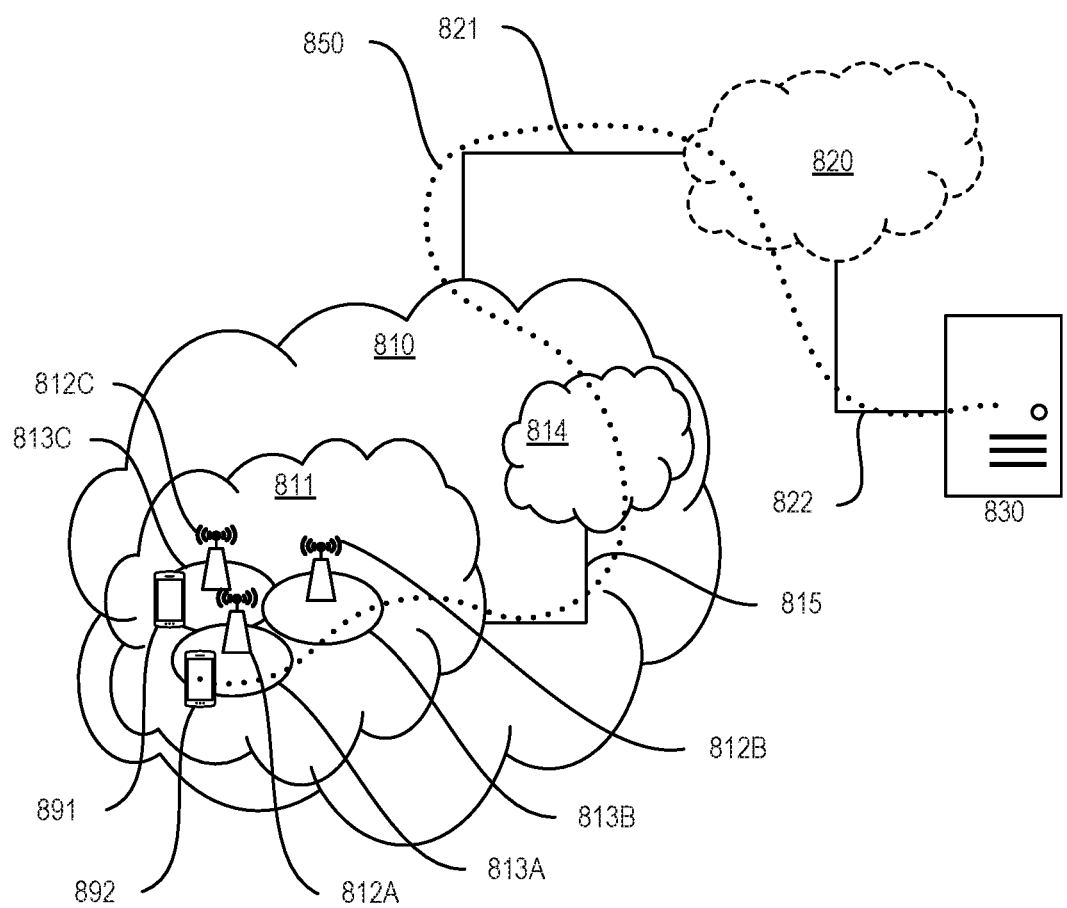
FIG. 8 illustrates an example communication system in which embodiments of the present disclosure may be implemented.

With reference to FIG. 8, in accordance with an embodiment, a communication system includes a telecommunication network 810, such as a 3GPP-type cellular network, which comprises an access network 811, such as a RAN, and a core network 814. The access network 811 comprises a plurality of base stations 812A, 812B, 812C, such as Node Bs, eNBs, gNBs, or other types of wireless APs, each defining a corresponding coverage area 813A, 813B, 813C. Each base station 812A, 812B, 812C is connectable to the core network 814 over a wired or wireless connection 815. A first UE 891 located in coverage area 813C is configured to wirelessly connect to, or be paged by, the corresponding base station 812C. A second UE 892 in coverage area 813A is wirelessly connectable to the corresponding base station 812A. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server, or as processing resources in a server farm. The host computer 830 may be under the ownership or control of a service provider, or may be operated by the service provider or on behalf of the service provider. Connections 821 and 822 between telecommunication network 810 and the host computer 830 may extend directly from the core network 814 to the host computer 830 or may go via an optional intermediate network 820. The intermediate network 820 may be one of, or a combination of more than one of, a public, private, or hosted network; the intermediate network 820, if any, may be a backbone network or the Internet; in particular, the intermediate network 820 may comprise two or more sub-networks (not shown).

The communication system of FIG. 8 as a whole enables connectivity between the connected UEs 891, 892 and the host computer 830. The connectivity may be described as an Over-the-Top (OTT) connection 850. The host computer 830 and the connected UEs 891, 892 are configured to communicate data and/or signaling via the OTT connection 850, using the access network 811, the core network 814, any intermediate network 820, and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 891. Similarly, the base station 812 need not be aware of the future routing of an outgoing uplink communication originating from the UE 891 towards the host computer 830.

Example implementations, in accordance with an embodiment, of the UE, base station, and host computer discussed in the preceding paragraphs will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises processing circuitry 918, which may have storage and/or processing capabilities. In particular, the processing circuitry 918 may comprise one or more programmable processors, ASICs, FPGAs, or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as a UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 9) served by the base station 920. The communication interface 926 may be configured to facilitate a connection 960 to the host computer 910. The connection 960 may be direct or it may pass through a core network (not shown in FIG. 9) of the telecommunication system and/or through one or more intermediate networks outside the telecommunication system. In the embodiment shown, the hardware 925 of the base station 920 further includes processing circuitry 928, which may comprise one or more programmable processors, ASICs, FPGAs, or combinations of these (not shown) adapted to execute instructions. The base station 920 further has software 921 stored internally or accessible via an external connection.

The communication system 900 further includes the UE 930 already referred to. The UE's 930 hardware 935 may include a radio interface 937 configured to set up and maintain a wireless connection 970 with a base station serving a coverage area in which the UE 930 is currently located. The hardware 935 of the UE 930 further includes processing circuitry 938, which may comprise one or more programmable processors, ASICs, FPGAs, or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, the executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

Figure 9:
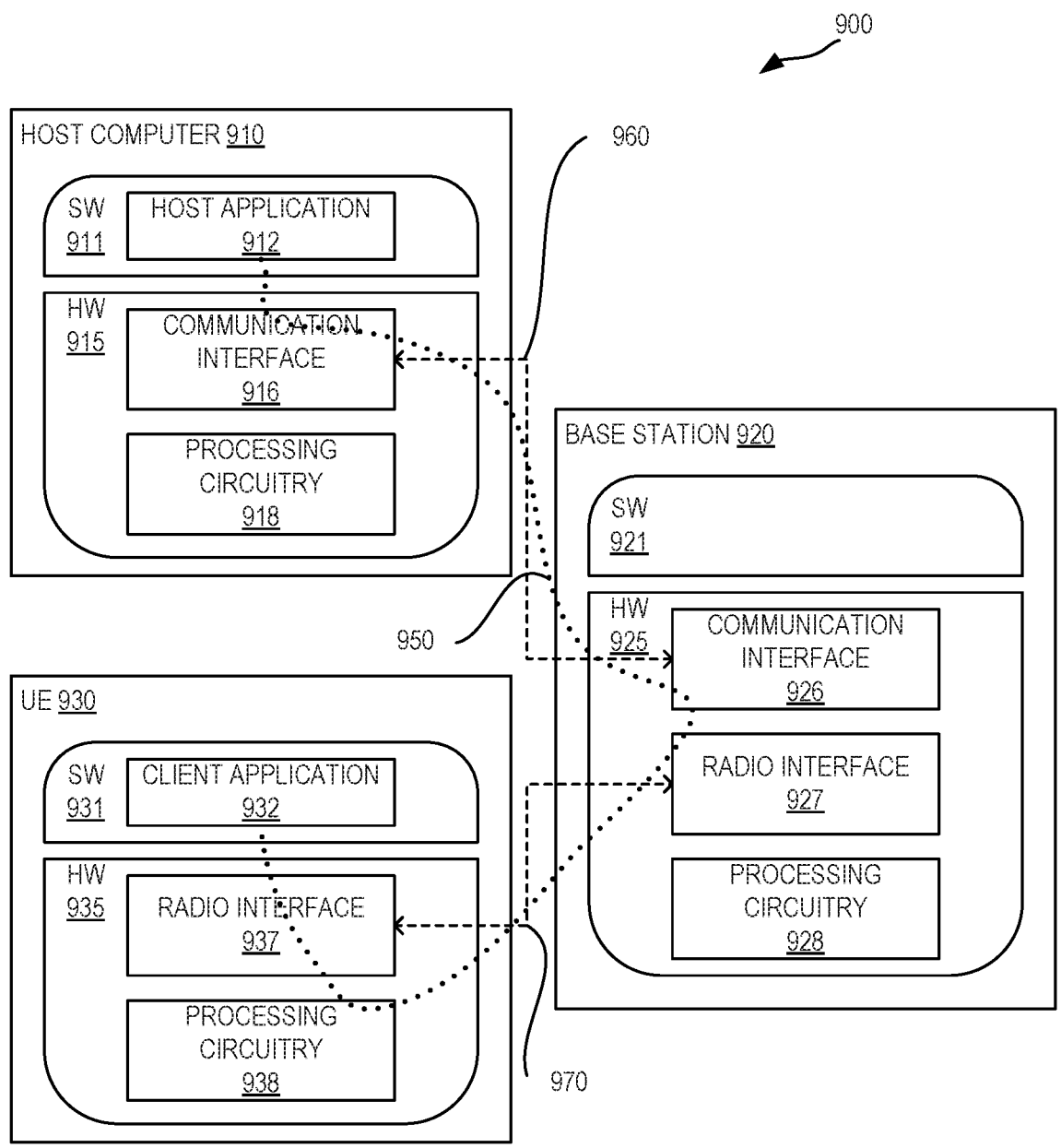
FIG. 9 illustrates an example implementation of the UE, base station, and host computer of FIG. 8.

It is noted that the host computer 910, the base station 920, and the UE 930 illustrated in FIG. 9 may be similar or identical to the host computer 830, one of the base stations 812A, 812B, 812C, and one of the UEs 891, 892 of FIG. 8, respectively. This is to say, the inner workings of these entities may be as shown in FIG. 9 and independently, the surrounding network topology may be that of FIG. 8.

In FIG. 9, the OTT connection 950 has been drawn abstractly to illustrate the communication between the host computer 910 and the UE 930 via the base station 920 without explicit reference to any intermediary devices and the precise routing of messages via these devices. The network infrastructure may determine the routing, which may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

The wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 950 between the host computer 910 and the UE 930, in response to variations in the measurement results. The measurement procedure and/or the network functionality for reconfiguring the OTT connection 950 may be implemented in the software 911 and the hardware 915 of the host computer 910 or in the software 931 and the hardware 935 of the UE 930, or both. In some embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing, etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer 910's measurements of throughput, propagation times, latency, and the like. The measurements may be implemented in that the software 911 and 931 causes messages to be transmitted, in particular empty or 'dummy' messages, using the OTT connection 950 while it monitors propagation times, errors, etc.

Figures 10, 11:
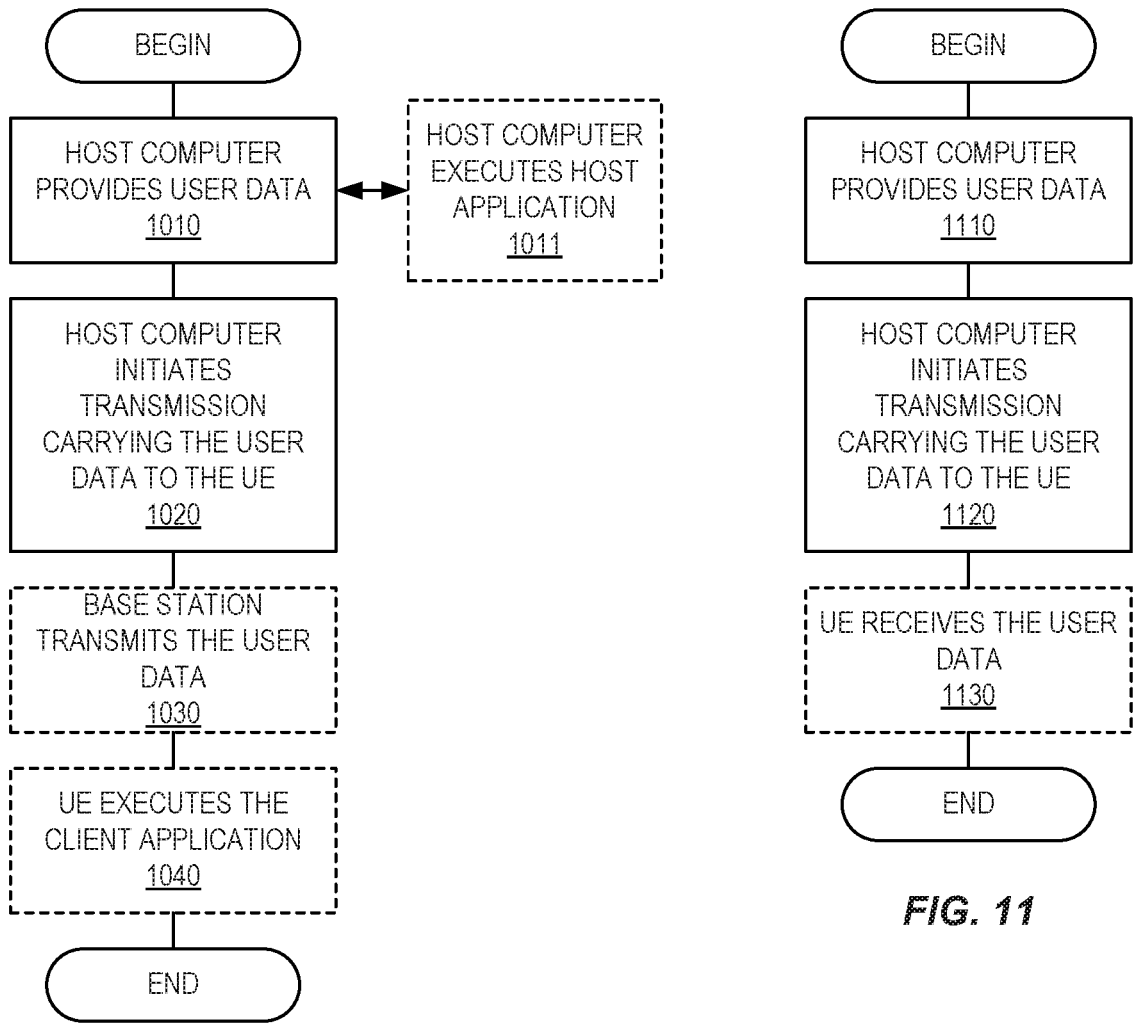
FIGS. 10 through 13 are flow charts illustrating methods implemented in a communication system such as that of FIGS. 8 and 9.

FIG. 10 is a flowchart illustrating a method implemented in a communication system, in accordance with one embodiment. The communication system includes a host computer, a base station, and a UE which may be those described with reference to FIGS. 8 and 9. For simplicity of the present disclosure, only drawing references to FIG. 10 will be included in this section. In step 1010, the host computer provides user data. In sub-step 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

FIG. 11 is a flowchart illustrating a method implemented in a communication system, in accordance with one embodiment. The communication system includes a host computer, a base station, and a UE which may be those described with reference to FIGS. 8 and 9. For simplicity of the present disclosure, only drawing references to FIG. 11 will be included in this section. In step 1110 of the method, the host computer provides user data. In an optional sub-step (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figures 12, 13:
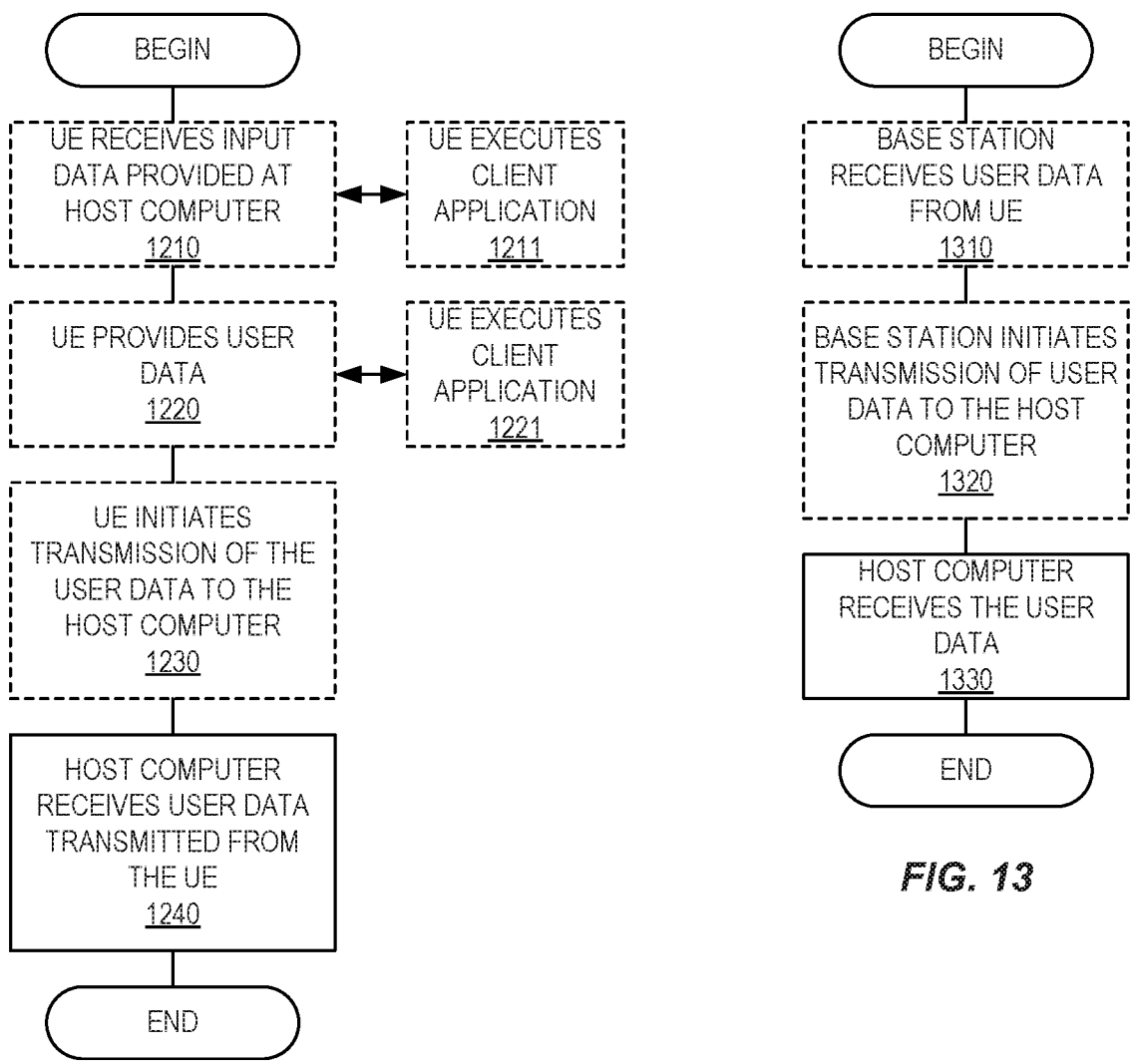

FIG. 12 is a flowchart illustrating a method implemented in a communication system, in accordance with one embodiment. The communication system includes a host computer, a base station, and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally or alternatively, in step 1220, the UE provides user data. In sub-step 1221 (which may be optional) of step 1220, the UE provides the user data by executing a client application. In sub-step 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in sub-step 1230 (which may be optional), transmission of the user data to the host computer. In step 1240 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station, and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Figure 14:
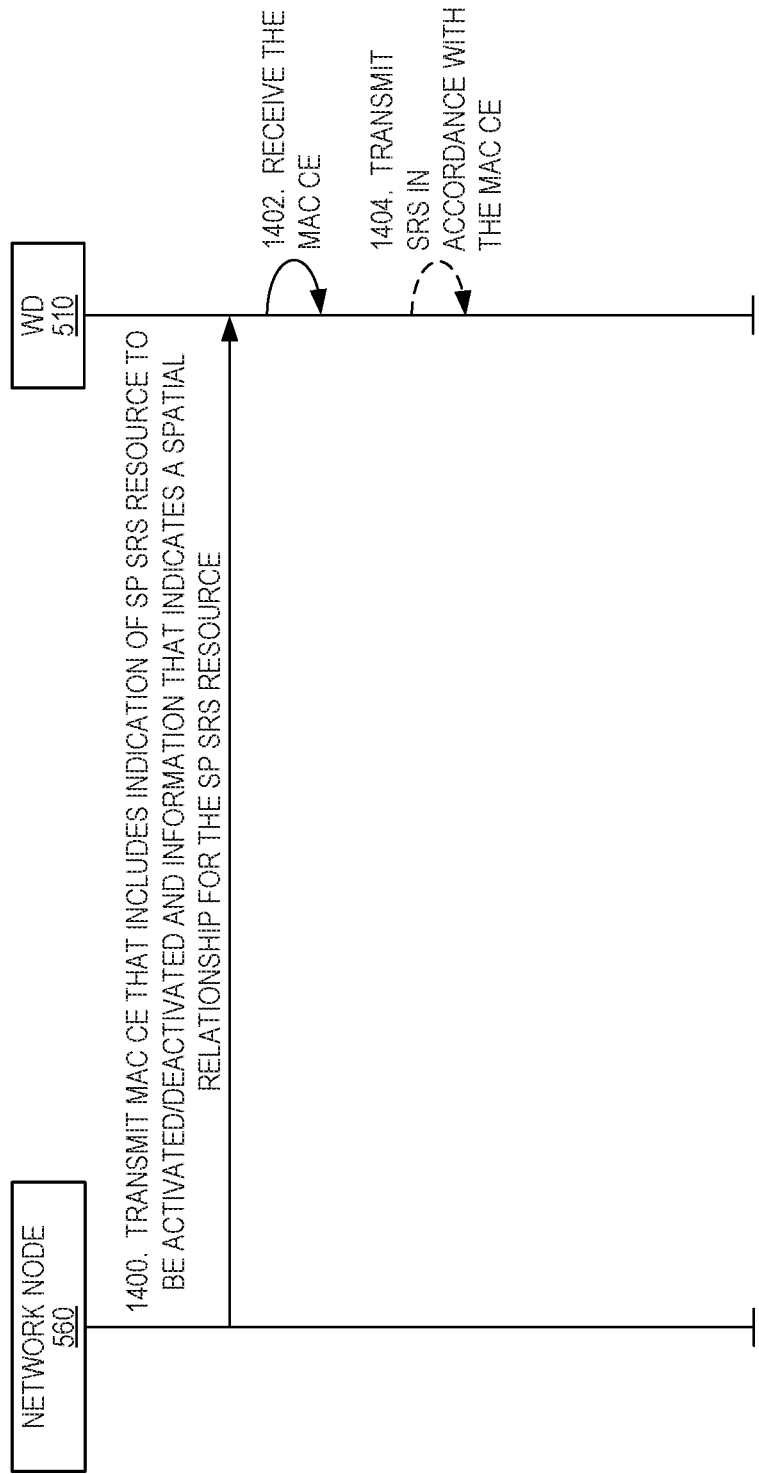
FIG. 14 depicts a method of operation of a network node and a wireless device in accordance with some embodiments of the present disclosure.

FIG. 14 depicts a method in accordance with particular embodiments, the method begins at step 1400 where the network node 560 (e.g., base station) transmits a MAC CE that includes an indication of a SP SRS resource to be activated or deactivated (activated/deactivated) and information that indicates a spatial relationship for the SP SRS resource (step 1400). Again, as noted above, while the term SP SRS "resource" is sometimes used herein, it is to be understood that the SP SRS resource can be, at least in some embodiments, an SP SRS "resource set." The MAC CE can be that of any of the embodiments described herein (e.g., any one of the first embodiment and the second embodiment described above with respect to, e.g., FIGS. 3 and 4). The WD 510 receives the MAC CE (step 1402) and, optionally, transmits SRS in accordance with the information received in the MAC CE (step 1404). For example, if a SP SRS resource is activated, the WD 510 transmits SRS on the activated SP SRS resource using, e.g., the uplink beam indicated by the spatial relationship indicated in the MAC CE.

Figure 15:
FIG. 15 illustrates a schematic block diagram of an apparatus in a wireless device in accordance with some embodiments of the present disclosure.

FIG. 15 illustrates a schematic block diagram of an apparatus 1500 in a wireless network (for example, the wireless network shown in FIG. 5). The apparatus may be implemented in a wireless device or network node (e.g., the WD 510 or the network node 560 shown in FIG. 5). The apparatus 1500 is operable to carry out the example method described with reference to FIG. 14 and possibly any other processes or methods disclosed herein. It is also to be understood that the method of FIG. 14 is not necessarily carried out solely by the apparatus 1500. At least some operations of the method can be performed by one or more other entities.

The virtual apparatus 1500 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause one or more units 1502, and any other suitable units of the apparatus 1500, to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some example embodiments are as follows.

Group A Embodiments

Embodiment 1: A method of operation of a wireless device for activating a semi-persistent sounding reference signal resource for a wireless device in a cellular communications network, comprising receiving, from a network node, a Medium Access Control, MAC, Control Element, CE, comprising: an indication of a semi-persistent sounding reference signal resource to be activated/deactivated; and information that indicates a spatial relation for the semi-persistent sounding reference signal resource to be activated/deactivated.

Embodiment 2: The method of embodiment 1 wherein the information that indicates the spatial relation comprises: an indication of a type of reference signal for which the spatial relation is provided; and an identifier of a reference signal resource for the type of reference signal for which the spatial relation is provided.

Embodiment 3: The method of embodiment 2 wherein the indication of the type of reference signal indicates that the type of reference signal is a Channel State Information Reference Signal, CSI-RS, a Synchronization Signal Block, SSB, or a Sounding Reference Signal, SRS.

Embodiment 4: The method of embodiment 2 wherein the indication of the type of reference signal comprises two bits that indicate the type of reference signal, wherein: a first state of the two bits indicates that the type of reference signal is a first type of reference signal; a second state of the two bits indicates that the type of reference signal is a second type of reference signal; and a third state of the two bits indicates that the type of reference signal is a third type of reference signal.

Embodiment 5: The method of embodiment 4 wherein the first type of reference signal is a Channel State Information Reference Signal, CSI-RS, the second type of reference signal is a Synchronization Signal Block, SSB, and the third type of reference signal is a Sounding Reference Signal, SRS.

Embodiment 6: The method of embodiment 2 wherein the MAC CE comprises: a first octet that comprises the indication of the semi-persistent sounding reference signal resource to be activated/deactivated; and a second octet that comprises the indication of the type of reference signal for which the spatial relation is provided and the identifier of the reference signal resource for the type of reference signal for which the spatial relation is provided.

Embodiment 7: The method of embodiment 6 wherein:
if a first bit in the second octet is set to a first state:
  the first bit serves as the indication of the type of reference signal for which the spatial relation is provided and the type of reference signal for which the spatial relation is provided is a Channel State Information Reference Signal, CSI-RS; and
  remaining bits in the second octet serve as the identifier of the reference signal resource for the CSI-RS;
if the first bit in the second octet is set to a second state:
  if a second bit in the second octet is set to a first state:
    the first bit and the second bit serve as the indication of the type of reference signal for which the spatial relation is provided and the type of reference signal for which the spatial relation is provided is a Synchronization Signal Block, SSB; and
    remaining bits in the second octet serve as the identifier of the reference signal resource for the SSB; and
  if the second bit in the second octet is set to a second state:
    the first bit and the second bit serve as the indication of the type of reference signal for which the spatial relation is provided and the type of reference signal for which the spatial relation is provided is a Sounding Reference Signal, SRS; and
    all but one of the remaining bits in the second octet serve as the identifier of the reference signal resource for the SRS.

Embodiment 8: The method of embodiment 6 wherein a first bit in the second octet is set to a first state such that the first bit serves as the indication of the type of reference signal for which the spatial relation is provided and the type of reference signal for which the spatial relation is provided is a Channel State Information Reference Signal, CSI-RS; and remaining bits in the second octet serve as the identifier of the reference signal resource for the CSI-RS.

Embodiment 9: The method of embodiment 6 wherein: a first bit in the second octet is set to a second state; a second bit in the second octet is set to a first state such that the first bit and the second bit serve as the indication of the type of reference signal for which the spatial relation is provided and the type of reference signal for which the spatial relation is provided is a Synchronization Signal Block, SSB; and remaining bits in the second octet serve as the identifier of the reference signal resource for the SSB.

Embodiment 10: The method of embodiment 6 wherein: a first bit in the second octet is set to a second state; a second bit in the second octet is set to a second state such that the first bit and the second bit serve as the indication of the type of reference signal for which the spatial relation is provided and the type of reference signal for which the spatial relation is provided is a Sounding Reference Signal, SRS; and all but one of the remaining bits in the second octet serve as the identifier of the reference signal resource for the SRS.

Embodiment 11: The method of embodiment 1 wherein: if a first bit of an octet of the MAC CE is set to a first state, the remaining bits in the octet comprise a first set of fields; if the first bit of the octet is set to a second state and a second bit of the octet is set to a first state, the remaining bits in the octet comprise a second set of fields; and if the first bit of the octet is set to a second state and the second bit of the octet is set to a second state, the remaining bits in the octet comprising a third set of fields.

Embodiment 12: The method of embodiment 11 wherein the first set of fields comprises a field comprising bits providing an identifier of a Channel State Information Reference Signal, CSI-RS, resource for which a spatial relation is indicated.

Embodiment 13: The method of embodiment 11 or 12 wherein the second set of fields comprises a field comprising bits providing an identifier of a Synchronization Signal Block, SSB, resource for which a spatial relation is indicated.

Embodiment 14: The method of any one of embodiments 11 to 13 wherein the third set of fields comprises a field comprising bits providing an identifier of a Sounding Reference Signal, SRS, resource for which a spatial relation is indicated.

Embodiment 15: The method of any of the previous embodiments, further comprising: providing user data; and forwarding the user data to a host computer via the transmission to the base station.

Group B Embodiments

Embodiment 16: A method of operation of a network node (e.g., a base station) for activating a semi-persistent sounding reference signal resource for a wireless device in a cellular communications network, comprising transmitting, to a wireless device, a Medium Access Control, MAC, Control Element, CE, comprising: an indication of a semi-persistent sounding reference signal resource to be activated/deactivated; and information that indicates a spatial relation for the semi-persistent sounding reference signal resource to be activated/deactivated.

Embodiment 17: The method of embodiment 16 wherein the information that indicates the spatial relation comprises: an indication of a type of reference signal for which the spatial relation is provided; and an identifier of a reference signal resource for the type of reference signal for which the spatial relation is provided.

Embodiment 18: The method of embodiment 17 wherein the indication of the type of reference signal indicates that the type of reference signal is a Channel State Information Reference Signal, CSI-RS, a Synchronization Signal Block, SSB, or a Sounding Reference Signal, SRS.

Embodiment 19: The method of embodiment 17 wherein the indication of the type of reference signal comprises two bits that indicate the type of reference signal, wherein: a first state of the two bits indicates that the type of reference signal is a first type of reference signal; a second state of the two bits indicates that the type of reference signal is a second type of reference signal; and a third state of the two bits indicates that the type of reference signal is a third type of reference signal.

Embodiment 20: The method of embodiment 19 wherein the first type of reference signal is a Channel State Information Reference Signal, CSI-RS, the second type of reference signal is a Synchronization Signal Block, SSB, and the third type of reference signal is a Sounding Reference Signal, SRS.

Embodiment 21: The method of embodiment 17 wherein the MAC CE comprises: a first octet that comprises the indication of the semi-persistent sounding reference signal resource to be activated/deactivated; and a second octet that comprises the indication of the type of reference signal for which the spatial relation is provided and the identifier of the reference signal resource for the type of reference signal for which the spatial relation is provided.

Embodiment 22: The method of embodiment 21 wherein:
if a first bit in the second octet is set to a first state:
the first bit serves as the indication of the type of reference signal for which the spatial relation is provided and the type of reference signal for which the spatial relation is provided is a Channel State Information Reference Signal, CSI-RS; and
remaining bits in the second octet serve as the identifier of the reference signal resource for the CSI-RS;
if the first bit in the second octet is set to a second state:
if a second bit in the second octet is set to a first state:
the first bit and the second bit serve as the indication of the type of reference signal for which the spatial relation is provided and the type of reference signal for which the spatial relation is provided is a Synchronization Signal Block, SSB; and
remaining bits in the second octet serve as the identifier of the reference signal resource for the SSB; and
if the second bit in the second octet is set to a second state:
the first bit and the second bit serve as the indication of the type of reference signal for which the spatial relation is provided and the type of reference signal for which the spatial relation is provided is a Sounding Reference Signal, SRS; and
all but one of the remaining bits in the second octet serve as the identifier of the reference signal resource for the SRS.

Embodiment 23: The method of embodiment 21 wherein: a first bit in the second octet is set to a first state such that the first bit serves as the indication of the type of reference signal for which the spatial relation is provided and the type of reference signal for which the spatial relation is provided is a Channel State Information Reference Signal, CSI-RS; and remaining bits in the second octet serve as the identifier of the reference signal resource for the CSI-RS.

Embodiment 24: The method of embodiment 21 wherein: a first bit in the second octet is set to a second state; a second bit in the second octet is set to a first state such that the first bit and the second bit serve as the indication of the type of reference signal for which the spatial relation is provided and the type of reference signal for which the spatial relation is provided is a Synchronization Signal Block, SSB; and remaining bits in the second octet serve as the identifier of the reference signal resource for the SSB.

Embodiment 25: The method of embodiment 21 wherein: a first bit in the second octet is set to a second state; a second bit in the second octet is set to a second state such that the first bit and the second bit serve as the indication of the type of reference signal for which the spatial relation is provided and the type of reference signal for which the spatial relation is provided is a Sounding Reference Signal, SRS; and all but one of the remaining bits in the second octet serve as the identifier of the reference signal resource for the SRS.

Embodiment 26: The method of embodiment 16 wherein: if a first bit of an octet of the MAC CE is set to a first state, the remaining bits in the octet comprise a first set of fields; if the first bit of the octet is set to a second state and a second bit of the octet is set to a first state, the remaining bits in the octet comprise a second set of fields; and if the first bit of the octet is set to a second state and the second bit of the octet is set to a second state, the remaining bits in the octet comprising a third set of fields.

Embodiment 27: The method of embodiment 26 wherein the first set of fields comprises a field comprising bits providing an identifier of a Channel State Information Reference Signal, CSI-RS, resource for which a spatial relation is indicated.

Embodiment 28: The method of embodiment 26 or 27 wherein the second set of fields comprises a field comprising bits providing an identifier of a Synchronization Signal Block, SSB, resource for which a spatial relation is indicated.

Embodiment 29: The method of any one of embodiments 26 to 28 wherein the third set of fields comprises a field comprising bits providing an identifier of a Sounding Reference Signal, SRS, resource for which a spatial relation is indicated.

Embodiment 30: The method of any of the previous embodiments, further comprising: obtaining user data; and forwarding the user data to a host computer or a wireless device.

Group C Embodiments

Embodiment 31: A wireless device for activating a semi-persistent sounding reference signal resource for a wireless device in a cellular communications network, the wireless device comprising: processing circuitry configured to perform any of the steps of any of the Group A embodiments; and power supply circuitry configured to supply power to the wireless device.

Embodiment 32: A base station for activating a semi-persistent sounding reference signal resource for a wireless device in a cellular communications network, the base station comprising: processing circuitry configured to perform any of the steps of any of the Group B embodiments; power supply circuitry configured to supply power to the base station.

Embodiment 33: A User Equipment, UE, for activating a semi-persistent sounding reference signal resource for a wireless device in a cellular communications network, the UE comprising: antennas configured to send and receive wireless signals; radio front-end circuitry connected to the antennas and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 34: A communication system including a host computer comprising: processing circuitry configured to provide user data; and a communication interface configured to forward the user data to a cellular network for transmission to a User Equipment, UE, wherein the cellular network comprises a base station having a radio interface and processing circuitry, the base station's processing circuitry configured to perform any of the steps of any of the Group B embodiments.

Embodiment 35: The communication system of the previous embodiment further including the base station.

Embodiment 36: The communication system of the previous 2 embodiments, further including the UE, wherein the UE is configured to communicate with the base station.

Embodiment 37: The communication system of the previous 3 embodiments, wherein: the processing circuitry of the host computer is configured to execute a host application, thereby providing the user data; and the UE comprises processing circuitry configured to execute a client application associated with the host application.

Embodiment 38: A method implemented in a communication system including a host computer, a base station and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 39: The method of the previous embodiment, further comprising, at the base station, transmitting the user data.

Embodiment 40: The method of the previous 2 embodiments, wherein the user data is provided at the host computer by executing a host application, the method further comprising, at the UE, executing a client application associated with the host application.

Embodiment 41: A User Equipment, UE, configured to communicate with a base station, the UE comprising a radio interface and processing circuitry configured to perform the method of the previous 3 embodiments.

Embodiment 42: A communication system including a host computer comprising: processing circuitry configured to provide user data; and a communication interface configured to forward user data to a cellular network for transmission to a User Equipment, UE, wherein the UE comprises a radio interface and processing circuitry, the UE's components configured to perform any of the steps of any of the Group A embodiments.

Embodiment 43: The communication system of the previous embodiment, wherein the cellular network further includes a base station configured to communicate with the UE.

Embodiment 44: The communication system of the previous 2 embodiments, wherein: the processing circuitry of the host computer is configured to execute a host application, thereby providing the user data; and the UE's processing circuitry is configured to execute a client application associated with the host application.

Embodiment 45: A method implemented in a communication system including a host computer, a base station and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 46: The method of the previous embodiment, further comprising at the UE, receiving the user data from the base station.

Embodiment 47: A communication system including a host computer comprising: communication interface configured to receive user data originating from a transmission from a User Equipment, UE, to a base station, wherein the UE comprises a radio interface and processing circuitry, the UE's processing circuitry configured to perform any of the steps of any of the Group A embodiments.

Embodiment 48: The communication system of the previous embodiment, further including the UE.

Embodiment 49: The communication system of the previous 2 embodiments, further including the base station, wherein the base station comprises a radio interface configured to communicate with the UE and a communication interface configured to forward to the host computer the user data carried by a transmission from the UE to the base station.

Embodiment 50: The communication system of the previous 3 embodiments, wherein: the processing circuitry of the host computer is configured to execute a host application; and the UE's processing circuitry is configured to execute a client application associated with the host application, thereby providing the user data.

Embodiment 51: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 52: A method implemented in a communication system including a host computer, a base station and a User Equipment, UE, the method comprising: at the host computer, receiving user data transmitted to the base station from the UE, wherein the UE performs any of the steps of any of the Group A embodiments.

Embodiment 53: The method of the previous embodiment, further comprising, at the UE, providing the user data to the base station.

Embodiment 54: The method of the previous 2 embodiments, further comprising: at the UE, executing a client application, thereby providing the user data to be transmitted; and at the host computer, executing a host application associated with the client application.

Embodiment 55: The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 56: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 57: The communication system of the previous embodiment further including the base station.

Embodiment 58: The communication system of the previous 2 embodiments, further including the UE, wherein the UE is configured to communicate with the base station.

Embodiment 59: The communication system of the previous 3 embodiments, wherein: the processing circuitry of the host computer is configured to execute a host application; the UE is configured to execute a client application associated with the host application, thereby providing the user data to be received by the host computer.

Embodiment 60: A method implemented in a communication system including a host computer, a base station and a User Equipment, UE, the method comprising: at the host computer, receiving, from the base station, user data originating from a transmission which the base station has received from the UE, wherein the UE performs any of the steps of any of the Group A embodiments.

Embodiment 61: The method of the previous embodiment, further comprising at the base station, receiving the user data from the UE.

Embodiment 62: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AC Alternating Current
AP Access Point
AP SRS Aperiodic Sounding Reference Signal
ASIC Application Specific Integrated Circuit
ATM Asynchronous Transfer Mode
BS Base Station
BSC Base Station Controller
BTS Base Transceiver Station
CD Compact Disk
CDMA Code Division Multiple Access
CE Control Element
COTS Commercial Off-the-Shelf
CP-OFDM Cyclic Prefix Orthogonal Frequency Division Multiplexing
CPE Customer Premise Equipment
CPU Central Processing Unit
CQI Channel Quality Information
CRI Channel State Information Reference Signal Index
CSI-RS Channel State Information Reference Signal
D2D Device-to-Device
DAS Distributed Antenna System
DC Direct Current
DCI Downlink Control Information
DIMM Dual In-Line Memory Module
DSP Digital Signal Processor
DVD Digital Video Disk
EEPROM Electrically Erasable Programmable Read Only Memory
eFD-MIMO Enhanced Full Dimension Multiple Input Multiple Output
eMTC Enhanced Machine-Type Communication
eNB Enhanced or Evolved Node B
EPROM Erasable Programmable Read Only Memory
E-SMLC Evolved Serving Mobile Location Center
FDD Frequency Division Duplexing
FD-MIMO Full Dimension Multiple Input Multiple Output
FPGA Field Programmable Gate Array
GHz Gigahertz
gNB Next Generation or New Radio Base Station
GPS Global Positioning System
GSM Global System for Mobile Communications
HDDS Holographic Digital Data Storage
HD-DVD High-Density Digital Versatile Disc
ID Identifier
IE Information Element
I/O Input and Output
IoT Internet of Things
IP Internet Protocol
LAN Local Area Network
LEE Laptop Embedded Equipment
LME Laptop Mounted Equipment
LTE Long Term Evolution
M2M Machine-to-Machine
MAC Medium Access Control
MANO Management and Orchestration
MCE Multi-Cell/Multicast Coordination Entity
MCS Modulation and Coding State
MDT Minimization of Drive Tests
MIMO Multiple Input Multiple Output
MME Mobility Management Entity
MSC Mobile Switching Center
MSR Multi-Standard Radio
MTC Machine Type Communication
NB-IoT Narrowband Internet of Things
NFV Network Function Virtualization
NIC Network Interface Controller
NR New Radio
O&M Operation and Maintenance
OFDM Orthogonal Frequency Division Multiplexing
OSS Operations Support System
OTT Over-the-Top
PDA Personal Digital Assistant
PDCCH Physical Downlink Control Channel
P-GW Packet Data Network Gateway
PMI Precoder Matrix Indicator
PROM Programmable Read Only Memory
P SRS Periodic Sounding Reference Signal
PSTN Public Switched Telephone Networks
PUSCH Physical Uplink Shared Channel
QCL Quasi Co-Location
RAID Redundant Array of Independent Disks
RAM Random Access Memory
RAN Radio Access Network
RAT Radio Access Technology
RF Radio Frequency
RI Rank Indicator
RNC Radio Network Controller
ROM Read Only Memory
RRC Radio Resource Control
RRH Remote Radio Head
RRU Remote Radio Unit
RS Reference Signal
RUIM Removable User Identity
SCEF Service Capability Exposure Function
SDRAM Synchronous Dynamic Random Access Memory
SIM Subscriber Identity Module
SOC System on a Chip
SON Self-Organizing Network
SONET Synchronous Optical Networking
SP SRS Semi-Persistent Sounding Reference Signal
SRI Sounding Reference Signal Resource Indicator
SRS Sounding Reference Signal
SSB Synchronization Signal Block
TCP Transmission Control Protocol
TDD Time Division Duplexing
TFRE Time/Frequency Resource Element
TPMI Transmit Precoder Matrix Indicator
TRI Transmission Rank Indicator
TRP Transmit-Receive Point
TS Technical Specification
UE User Equipment
UMTS Universal Mobile Telecommunications System
USB Universal Serial Bus
UTRAN Universal Terrestrial Radio Access Network
V2I Vehicle-to-Infrastructure
V2V Vehicle-to-Vehicle V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method of operation of a wireless device in a cellular communications network, comprising:
   receiving, from a network node, a Medium Access Control, MAC, Control Element, CE, comprising:
      an indication of a semi-persistent sounding reference signal resource set to be activated or deactivated; and
      information that indicates a spatial relation for the semi-persistent sounding reference signal resource set to be activated or deactivated;
   wherein the MAC CE comprises:
      a first octet that comprises the indication of the semi-persistent sounding reference signal resource set to be activated or deactivated;
      a second octet that comprises an indication of a type of reference signal for which the spatial relation is provided and an identifier of a reference signal resource set for the type of reference signal for which the spatial relation is provided;
      when the indication of the type of reference signal is set to "1", the identifier of the reference signal resource set comprises a Channel State Information Reference Signal, CSI-RS, resource index; and
      when the indication of the type of reference signal is set to "0", the identifier of the reference signal resource set comprises one or more of: Synchronization Signal Block, SSB, index; and Sounding Reference Signal, SRS, resource index.

2. The method of claim 1 wherein the indication of the type of reference signal comprises two bits that indicate the type of reference signal, wherein:
   a first state of the two bits indicates that the type of reference signal is a first type of reference signal;
   a second state of the two bits indicates that the type of reference signal is a second type of reference signal; and
   a third state of the two bits indicates that the type of reference signal is a third type of reference signal.

3. The method of claim 2 wherein the first type of reference signal is a CSI-RS the second type of reference signal is a SSB and the third type of reference signal is a SRS.

4. The method of claim 1 wherein:
   if a first bit in the second octet is set to a first state:
      the first bit serves as the indication of the type of reference signal for which the spatial relation is provided and the type of reference signal for which the spatial relation is provided is a CSI-RS; and
      remaining bits in the second octet serve as the identifier of the reference signal resource set for the CSI-RS; and
   if the first bit in the second octet is set to a second state:
      if a second bit in the second octet is set to the first state:
         the first bit and the second bit serve as the indication of the type of reference signal for which the spatial relation is provided and the type of reference signal for which the spatial relation is provided is a SSB; and
         remaining bits in the second octet serve as the identifier of the reference signal resource set for the SSB; and
      if the second bit in the second octet is set to the second state:
         the first bit and the second bit serve as the indication of the type of reference signal for which the spatial relation is provided and the type of reference signal for which the spatial relation is provided is a SRS; and
         all but one of the remaining bits in the second octet serve as the identifier of the reference signal resource set for the SRS.

5. The method of claim 1 wherein:
   a first bit in the second octet is set to a first state such that the first bit serves as the indication of the type of reference signal for which the spatial relation is provided and the type of reference signal for which the spatial relation is provided is a CSI-RS; and
   remaining bits in the second octet serve as the identifier of the reference signal resource set for the CSI-RS.

6. The method of claim 1 wherein:
   a first bit in the second octet is set to a second state;
   a second bit in the second octet is set to a first state such that the first bit and the second bit serve as the indication of the type of reference signal for which the spatial relation is provided and the type of reference signal for which the spatial relation is provided is a SSB; and
   remaining bits in the second octet serve as the identifier of the reference signal resource set for the SSB.

7. The method of claim 1 wherein:
   a first bit in the second octet is set to a second state;
   a second bit in the second octet is set to the second state such that the first bit and the second bit serve as the indication of the type of reference signal for which the spatial relation is provided and the type of reference signal for which the spatial relation is provided is a SRS; and
   all but one of the remaining bits in the second octet serve as the identifier of the reference signal resource set for the SRS.

8. The method of claim 1 wherein:
   if a first bit of an octet of the MAC CE is set to a first state, remaining bits in the octet comprise a first set of fields;
   if the first bit of the octet is set to a second state and a second bit of the octet is set to the first state, remaining bits in the octet comprise a second set of fields; and
   if the first bit of the octet is set to the second state and the second bit of the octet is set to the second state, remaining bits in the octet comprise a third set of fields.

9. The method of claim 8 wherein the first set of fields comprises a field comprising bits providing an identifier of a CSI-RS resource set for which the spatial relation is indicated.

10. The method of claim 8 wherein the second set of fields comprises a field comprising bits providing an identifier of a SSB resource set for which the spatial relation is indicated.

11. The method of claim 8 wherein the third set of fields comprises a field comprising bits providing an identifier of a SRS resource set for which the spatial relation is indicated.

12. The method of claim 1 wherein the indication is an indication to activate the semi-persistent sounding reference signal resource set, and the method further comprises transmitting a sounding reference signal on the activated semi-persistent sounding reference signal resource set.

13. A wireless device for a cellular communications network, the wireless device comprising:
an interface comprising radio front end circuitry; and
processing circuitry associated with the interface, the processing circuitry configured to cause the wireless device to:
receive, from a network node via the interface, a Medium Access Control, MAC, Control Element, CE, comprising:
an indication of a semi-persistent sounding reference signal resource set to be activated or deactivated; and
information that indicates a spatial relation for the semi-persistent sounding reference signal resource set to be activated or deactivated;
wherein the MAC CE comprises:
a first octet that comprises the indication of the semi-persistent sounding reference signal resource set to be activated or deactivated; and
a second octet that comprises an indication of a type of reference signal for which the spatial relation is provided and an identifier of a reference signal resource set for the type of reference signal for which the spatial relation is provided;
when the indication of the type of reference signal is set to "1", the identifier of the reference signal resource set comprises a Channel State Information Reference Signal, CSI-RS, resource index; and
when the indication of the type of reference signal is set to "0", the identifier of the reference signal resource set comprises one or more of: Synchronization Signal Block, SSB, index; and Sounding Reference Signal, SRS, resource index.

14. A method of operation of a network node in a cellular communications network, comprising:
transmitting, to a wireless device, a Medium Access Control, MAC, Control Element, CE, comprising:
an indication of a semi-persistent sounding reference signal resource set to be activated or deactivated; and
information that indicates a spatial relation for the semi-persistent sounding reference signal resource set to be activated or deactivated;
wherein the MAC CE comprises:
a first octet that comprises the indication of the semi-persistent sounding reference signal resource set to be activated or deactivated; and
a second octet that comprises an indication of a type of reference signal for which the spatial relation is provided and an identifier of a reference signal resource set for the type of reference signal for which the spatial relation is provided;
when the indication of the type of reference signal is set to "1", the identifier of the reference signal resource set comprises a Channel State Information Reference Signal, CSI-RS, resource index; and
when the indication of the type of reference signal is set to "0", the identifier of the reference signal resource set comprises one or more of: Synchronization Signal Block, SSB, index; and Sounding Reference Signal, SRS, resource index.

15. The method of claim 14 wherein:
if a first bit in the second octet is set to a first state:
the first bit serves as the indication of the type of reference signal for which the spatial relation is provided and the type of reference signal for which the spatial relation is provided is a CSI-RS; and
remaining bits in the second octet serve as the identifier of the reference signal resource set for the CSI-RS; and
if the first bit in the second octet is set to a second state:
if a second bit in the second octet is set to the first state:
the first bit and the second bit serve as the indication of the type of reference signal for which the spatial relation is provided and the type of reference signal for which the spatial relation is provided is a SSB; and
remaining bits in the second octet serve as the identifier of the reference signal resource set for the SSB; and
if the second bit in the second octet is set to the second state:
the first bit and the second bit serve as the indication of the type of reference signal for which the spatial relation is provided and the type of reference signal for which the spatial relation is provided is a SRS; and
all but one of the remaining bits in the second octet serve as the identifier of the reference signal resource set for the SRS.

* * * * *

UNITED STATES PATENT AND TRADEMARK OFFICE
CERTIFICATE OF CORRECTION

PATENT NO. : 11,483,110 B2
APPLICATION NO. : 16/277220
DATED : October 25, 2022
INVENTOR(S) : Määttänen et al.

It is certified that error appears in the above-identified patent and that said Letters Patent is hereby corrected as shown below:

In the Specification

In Column 1, Line 27, delete "User Equipment device (UE)" and insert -- User Equipment (UE) device --, therefor.

In Column 1, Line 60, delete "for where" and insert -- where --, therefor.

In Column 2, Line 10, delete "$y_n$," and insert -- $y_n$ --, therefor.

In Column 2, Line 55, delete "State" and insert -- Scheme --, therefor.

In Column 7, Lines 23-24, delete "User Equipment device (UE)" and insert -- User Equipment (UE) device --, therefor.

In Columns 7 and 8, Line 63, delete "(SIZE(0. ." and insert -- SEQUENCE (SIZE(0. . --, therefor.

In Columns 7 and 8, Line 65, delete "srs ResourceSetToAddModList" and insert -- srs-ResourceSetToAddModList --, therefor.

In Columns 7 and 8, Line 65, delete "maxNrofSRS" and insert -- maxNrofSRS- --, therefor.

In Columns 9 and 10, under Table, Line 9, delete "pucch SRS SimultaneousTransmission" and insert -- pucch-SRS-SimultaneousTransmission --, therefor.

In Columns 9 and 10, under Table, Line 14, delete "srs-ResourceIds" and insert -- srs-ResourcesIds --, therefor.

In Columns 9 and 10, under Table, Line 15, delete "(SIZE(1. .maxNrofSRS-ResourcePerSet))" and insert -- (SIZE(1. .maxNrofSRS-ResourcesPerSet)) --, therefor.

Signed and Sealed this
Sixth Day of June, 2023

Katherine Kelly Vidal
*Director of the United States Patent and Trademark Office*

CERTIFICATE OF CORRECTION (continued)
U.S. Pat. No. 11,483,110 B2

In Columns 9 and 10, under Table, Line 16, delete "The" and insert -- -- The --, therefor.

In Columns 9 and 10, under Table, Line 18, delete "(see" and insert -- -- (see --, therefor.

In Columns 9 and 10, under Table, Line 22, delete "ResourceStes-1)" and insert -- ResourceSets-1) --, therefor.

In Columns 9 and 10, under Table, Line 26, delete "4ports)," and insert -- 4ports}, --, therefor.

In Columns 9 and 10, under Table, Line 33, delete "hoping" and insert -- hopping --, therefor.

In Columns 9 and 10, under Table, Line 39, delete "(sec" and insert -- (see --, therefor.

In Column 12, Line 28, delete "$R_1$:" and insert -- $R_i$: --, therefor.

In Column 12, Line 30, delete "R," and insert -- $R_i$ --, therefor.

In Column 12, Line 33, delete "R," and insert -- Ri --, therefor.

In Column 24, Line 66, delete "(RUIM) module," and insert -- module (RUIM), --, therefor.

In Column 29, Line 43, delete "8128," and insert -- 812B, --, therefor.

In Column 31, Line 19, delete "sub-step 1230" and insert -- step 1230 --, therefor.

In Column 32, Line 20, delete "according" and insert -- according to --, therefor.

In Column 40, Line 7, delete "State" and insert -- Scheme --, therefor.

In Column 40, Line 43, delete "Identity" and insert -- Identity Module --, therefor.

In the Claims

In Column 41, Lines 66-67, in Claim 4, delete "CSI-RS; and" and insert -- CSI-RS; --, therefor.

In Column 43, Lines 34-35, in Claim 13, delete "index; and" and insert -- index; --, therefor.

In Column 44, Lines 12-13, in Claim 14, delete "index; and" and insert -- index; --, therefor.

In Column 44, Lines 26-27, in Claim 15, delete "CSI-RS; and" and insert -- CSI-RS; --, therefor.